(12) United States Patent
Jain et al.

(10) Patent No.: US 9,609,602 B2
(45) Date of Patent: Mar. 28, 2017

(54) ALWAYS-ON BEARER FOR SMALL DATA TRANSFERS IN LTE SYSTEMS

(71) Applicant: Intel Corporation, Santa Clara, CA (US)

(72) Inventors: Puneet Jain, Hillsboro, OR (US); Varun Rao, Cincinnati, OH (US); Alexandre Saso Stojanovski, Paris (FR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,252

(22) PCT Filed: Sep. 27, 2013

(86) PCT No.: PCT/US2013/062379
§ 371 (c)(1),
(2) Date: Dec. 13, 2013

(87) PCT Pub. No.: WO2014/052877
PCT Pub. Date: Apr. 3, 2014

(65) Prior Publication Data
US 2015/0223284 A1    Aug. 6, 2015

Related U.S. Application Data

(60) Provisional application No. 61/707,784, filed on Sep. 28, 2012.

(51) Int. Cl.
*H04W 24/02* (2009.01)
*H04W 52/02* (2009.01)
(Continued)

(52) U.S. Cl.
CPC ..... *H04W 52/0258* (2013.01); *H04L 65/4084* (2013.01); *H04L 65/608* (2013.01);
(Continued)

(58) Field of Classification Search
None
See application file for complete search history.

(56) References Cited

U.S. PATENT DOCUMENTS 7,461,253 B2    12/2008    Braskich et al.
8,976,954 B1    3/2015    Williams et al.
(Continued)

FOREIGN PATENT DOCUMENTS

BE    1020890 A5    7/2014
CN    103581880 A    2/2014
(Continued)

OTHER PUBLICATIONS

"U.S. Appl. No. 13/930,669, Response filed Jun. 25, 2015 to Non Final Office Action mailed Mar. 25, 2012", 12 pgs.
(Continued)

*Primary Examiner* — Gregory Sefcheck
*Assistant Examiner* — Jenkey Van
(74) *Attorney, Agent, or Firm* — Schwegman Lundberg & Woessner, P.A.

(57) ABSTRACT

When a UE in an LTE system enters the RRC_IDLE state, only the S5/S8 EPS bearer context is retained, and the S1-U, S1-AP and radio bearers are released. These bearers have to be re-established on per UE basis when the UE returns to RRC_CONNECTED state. A number of UE applications may send small data frequently, which causes the UE to toggle between IDLE and CONNECTED states. This leads to a great deal of signaling overhead as the radio bearer and the S1-U bearer must be frequently re-established as the UE transitions between IDLE to CONNECTED states. Described herein are methods and systems that provide an always-on S1-U bearer to reduce this signaling overhead.

24 Claims, 13 Drawing Sheets

(51) Int. Cl.
| | | |
|---|---|---|
| *H04W 48/14* | (2009.01) | |
| *H04W 72/04* | (2009.01) | |
| *H04W 76/04* | (2009.01) | |
| *H04W 4/00* | (2009.01) | |
| *H04W 76/02* | (2009.01) | |
| *H04L 29/06* | (2006.01) | |
| *H04W 40/00* | (2009.01) | |
| *H04W 76/06* | (2009.01) | |
| *H04W 36/08* | (2009.01) | |
| *H04W 48/18* | (2009.01) | |
| *H04W 88/08* | (2009.01) | |

(52) U.S. Cl.
CPC ........... *H04W 4/005* (2013.01); *H04W 24/02* (2013.01); *H04W 40/005* (2013.01); *H04W 48/14* (2013.01); *H04W 52/0209* (2013.01); *H04W 52/0212* (2013.01); *H04W 52/0235* (2013.01); *H04W 72/0406* (2013.01); *H04W 76/022* (2013.01); *H04W 76/046* (2013.01); *H04W 76/048* (2013.01); *H04W 76/06* (2013.01); *H04W 36/08* (2013.01); *H04W 48/18* (2013.01); *H04W 52/0261* (2013.01); *H04W 88/08* (2013.01); *Y02B 60/50* (2013.01)

(56) References Cited

U.S. PATENT DOCUMENTS

| | | | |
|---|---|---|---|
| 9,288,756 | B2 | 3/2016 | Stojanovski et al. |
| 9,332,456 | B2 | 5/2016 | Heo et al. |
| 2002/0184373 | A1 | 12/2002 | Maes |
| 2006/0031378 | A1 | 2/2006 | Vallapureddy et al. |
| 2007/0003062 | A1 | 1/2007 | Mizikovsky et al. |
| 2007/0081494 | A1 | 4/2007 | Petrescu et al. |
| 2007/0109989 | A1 | 5/2007 | Nakagawa et al. |
| 2008/0005568 | A1 | 1/2008 | Watson et al. |
| 2009/0181670 | A1 | 7/2009 | Tseng |
| 2009/0264124 | A1 | 10/2009 | Rofougaran |
| 2009/0265542 | A1 | 10/2009 | Khetawat et al. |
| 2010/0110896 | A1 | 5/2010 | Tseng et al. |
| 2010/0110897 | A1 | 5/2010 | Chun et al. |
| 2010/0272018 | A1 | 10/2010 | Furueda et al. |
| 2010/0285810 | A1 | 11/2010 | Ko et al. |
| 2010/0303039 | A1 | 12/2010 | Zhang et al. |
| 2010/0317343 | A1 | 12/2010 | Krishnamurthy et al. |
| 2011/0002281 | A1 | 1/2011 | Terry et al. |
| 2011/0075675 | A1* | 3/2011 | Koodli ................... H04L 12/14 370/401 |
| 2011/0078438 | A1 | 3/2011 | Tie et al. |
| 2011/0086652 | A1 | 4/2011 | So et al. |
| 2011/0116415 | A1 | 5/2011 | Naito et al. |
| 2011/0143796 | A1 | 6/2011 | Lee et al. |
| 2011/0170427 | A1 | 7/2011 | Koivisto et al. |
| 2011/0194505 | A1* | 8/2011 | Faccin .................. H04W 48/18 370/329 |
| 2011/0201275 | A1 | 8/2011 | Jabara et al. |
| 2011/0222466 | A1 | 9/2011 | Pance et al. |
| 2011/0269449 | A1 | 11/2011 | Kazmi et al. |
| 2011/0271334 | A1 | 11/2011 | Yang et al. |
| 2011/0292912 | A1 | 12/2011 | Zembutsu et al. |
| 2011/0305223 | A1 | 12/2011 | Koo et al. |
| 2012/0002537 | A1 | 1/2012 | Bao et al. |
| 2012/0044808 | A1 | 2/2012 | Song |
| 2012/0069817 | A1* | 3/2012 | Ling ..................... H04W 36/14 370/331 |
| 2012/0113816 | A1 | 5/2012 | Bhattad et al. |
| 2012/0120828 | A1 | 5/2012 | Anderson et al. |
| 2012/0144226 | A1 | 6/2012 | Yang et al. |
| 2012/0165034 | A1 | 6/2012 | Boudreau et al. |
| 2012/0176884 | A1 | 7/2012 | Zhang et al. |
| 2012/0184275 | A1* | 7/2012 | Okabe .................. H04W 8/065 455/435.1 |
| 2012/0282966 | A1 | 11/2012 | Koo et al. |
| 2012/0314689 | A1* | 12/2012 | Wang .................... H04W 36/12 370/331 |
| 2013/0024684 | A1 | 1/2013 | Chunduri et al. |
| 2013/0039287 | A1* | 2/2013 | Rayavarapu ........ H04W 76/048 370/329 |
| 2013/0044708 | A1* | 2/2013 | Kim .................... H04W 4/06 370/329 |
| 2013/0100871 | A1 | 4/2013 | Vujcic |
| 2013/0121220 | A1 | 5/2013 | Virtej et al. |
| 2013/0142166 | A1* | 6/2013 | Bogineni ................ H04W 8/02 370/331 |
| 2013/0157661 | A1* | 6/2013 | Bhaskaran ............ H04W 60/00 455/436 |
| 2013/0188558 | A1 | 7/2013 | Nam et al. |
| 2013/0194931 | A1 | 8/2013 | Lee et al. |
| 2013/0242897 | A1 | 9/2013 | Meylan et al. |
| 2013/0244676 | A1 | 9/2013 | Koivisto et al. |
| 2013/0279437 | A1 | 10/2013 | Ng et al. |
| 2013/0322235 | A1 | 12/2013 | Khoryaev et al. |
| 2013/0322352 | A1 | 12/2013 | Han et al. |
| 2014/0003375 | A1 | 1/2014 | Nam et al. |
| 2014/0022988 | A1 | 1/2014 | Davydov et al. |
| 2014/0036810 | A1 | 2/2014 | Harrison |
| 2014/0092828 | A1 | 4/2014 | Sirotkin |
| 2014/0094119 | A1 | 4/2014 | Stojanovski et al. |
| 2014/0105011 | A1* | 4/2014 | Chandramouli ........ H04W 4/08 370/230 |
| 2014/0213259 | A1 | 7/2014 | Teyeb et al. |
| 2014/0293973 | A1 | 10/2014 | Lin et al. |
| 2014/0357273 | A1 | 12/2014 | Teng et al. |
| 2015/0109982 | A1 | 4/2015 | Futaki |
| 2015/0117286 | A1 | 4/2015 | Kim et al. |
| 2015/0195822 | A1 | 7/2015 | Han et al. |
| 2015/0223050 | A1 | 8/2015 | Yiu et al. |
| 2015/0305083 | A1 | 10/2015 | Heo et al. |

FOREIGN PATENT DOCUMENTS

| | | |
|---|---|---|
| CN | 104737485 A | 6/2015 |
| CN | 104737619 A | 6/2015 |
| CN | 104813693 A | 7/2015 |
| CN | 104904303 A | 9/2015 |
| CN | 105103590 A | 11/2015 |
| EP | 2381709 A1 | 10/2011 |
| EP | 2485540 A1 | 8/2012 |
| EP | 2871896 A1 | 5/2015 |
| EP | 2875588 A | 5/2015 |
| EP | 2901603 A1 | 8/2015 |
| EP | 2901729 A1 | 8/2015 |
| EP | 2901740 A1 | 8/2015 |
| EP | 2901810 A1 | 8/2015 |
| EP | 2901811 A1 | 8/2015 |
| EP | 2918136 A1 | 9/2015 |
| ES | 2477040 A2 | 7/2014 |
| FI | 124643 B | 11/2014 |
| FR | 2993746 A1 | 1/2014 |
| JP | 2009171580 A | 7/2009 |
| JP | 2012507971 A | 3/2012 |
| JP | 2012100304 A | 5/2012 |
| JP | 2012175641 A | 9/2012 |
| JP | 2015525525 A | 3/2015 |
| JP | 2015534394 A | 11/2015 |
| KR | 1020090034269 A | 8/2009 |
| KR | 1020100034675 A | 4/2010 |
| KR | 1020110037420 A | 4/2011 |
| KR | 1020110111234 A | 10/2011 |
| KR | 1020150040989 A | 4/2015 |
| KR | 1020150064016 A | 6/2015 |
| TW | 201409980 A | 3/2014 |
| TW | 201611558 A | 3/2016 |
| WO | WO-2010101440 A2 | 9/2010 |
| WO | WO-2011055999 A2 | 5/2011 |
| WO | WO-2011100673 A1 | 8/2011 |
| WO | WO-2011108889 A2 | 9/2011 |
| WO | WO-2011116240 A1 | 9/2011 |
| WO | WO-2011136321 A1 | 11/2011 |
| WO | WO-2012085637 A1 | 6/2012 |
| WO | WO-2012094151 A2 | 7/2012 |

(56) References Cited

FOREIGN PATENT DOCUMENTS

| WO | WO-2012109542 A1 | 8/2012 |
|---|---|---|
| WO | WO-2013151404 A1 | 10/2013 |
| WO | WO-2014014576 A1 | 1/2014 |
| WO | WO-2014052303 A1 | 4/2014 |
| WO | WO-2014052730 A1 | 4/2014 |
| WO | WO-2014052774 A1 | 4/2014 |
| WO | WO-2014052850 A1 | 4/2014 |
| WO | WO-2014052877 A1 | 4/2014 |
| WO | WO-2014052905 A1 | 4/2014 |

OTHER PUBLICATIONS

"U.S. Appl. No. 14/125,749, Non Final Office Action mailed Sep. 10, 2015", 10 pgs.
"Netherlands Application Serial No. 2011185, Office Action mailed May 27, 2015", w/ English Claims, 10 pgs.
"Spanish Application Serial No. P201331103, Office Action Mailed Jun. 30, 2015", in English, 3 pgs.
"Taiwanese Application Serial No. 102125395, Office Action mailed Jun. 22, 2015", w/ English Translation, 22 pgs.
"U.S. Appl. No. 13/706,098, Final Office Action mailed Dec. 17, 2014", 24 pgs.
"U.S. Appl. No. 13/706,098, Non Final Office Action mailed May 9, 2014", 21 pgs.
"U.S. Appl. No. 13/706,098, Non Final Office Action mailed Jun. 4, 2015", 26 pgs.
"U.S. Appl. No. 13/706,098, Response filed Apr. 21, 2015 to Final Office Action mailed Dec. 17, 2014", 15 pgs.
"U.S. Appl. No. 13/706,098, Response filed Sep. 9, 2014 to Non-Final Office Action dated May 9, 2014", 10 pgs.
"U.S. Appl. No. 13/926,273, Non Final Office Action mailed Apr. 30, 2015", 22 pgs.
"U.S. Appl. No. 13/930,669, Non Final Office Action mailed Mar. 25, 2015", 11 pgs.
"Belgium Application Serial No. 2013/0503, Response filed May 5, 2014 to Belgium Search Report mailed Jul. 19, 2013", W/ English Claims, 13 pgs.
"Chinese Application Serial No. 201310304357.4, Preliminary Amendment filed Jun. 20, 2014", W/ English Claims, 8 pgs.
"Consideration on Reference Signal for E-PDCCH", InterDigital Communications, LLC, ingar i: 3GPP TSG RAN WG I Meeting #67, RI-113932, San Francisco, USA, (Nov. 9, 2011).
"European Application Serial No. 13841346.3, Amendment filed Mar. 16, 2015", 18 pgs.
"Finnish Application Serial No. 20135776, Office Action mailed Apr. 9, 2014", English translation, 6 pgs.
"Finnish Application Serial No. 20135776, Office Action mailed Jul. 3, 2014", W/ English Translation, 2 pgs.
"Finnish Application Serial No. 20135776, Response filed Jun. 23, 2014 Office Action mailed Apr. 9, 2014", W/ English Claims, 13 pgs.
"International Application Serial No. PCT/US2013/044756, International Preliminary Report on Patentability mailed Jan. 29, 2015", 6 pgs.
"International Application Serial No. PCT/US2013/061379, International Preliminary Report on Patentability mailed Apr. 9, 2015", 9 pgs.
"International Application Serial No. PCT/US2013/062132, International Preliminary Report on Patentability mailed Apr. 9, 2015", 8 pgs.
"International Application Serial No. PCT/US2013/062210, International Preliminary Report on Patentability mailed Apr. 9, 2015", 15 pgs.
"International Application Serial No. PCT/US2013/062340, International Preliminary Report on Patentability mailed Apr. 9, 2015", 8 pgs.
"International Application Serial No. PCT/US2013/062379, International Preliminary Report on Patentability mailed Apr. 9, 2015", 9 pgs.
"International Application Serial No. PCT/US2013/062427, International Preliminary Report on Patentability mailed Apr. 9, 2015", 8 pgs.
"Korean Application Serial No. 10-2015-7005286, Amendment filed Feb. 27, 2015", W/ English Agent's Note on Amendments, 5 pgs.
"Spanish Application Serial No. P201331103, Office Action mailed Apr. 28, 2015", w/ English Translation, 8 pgs.
"Spanish Application Serial No. P201331103, Office Action Mailed Sep. 22, 2014", W/ English Translation, 10 pgs.
"Spanish Application Serial No. P201331103,Response filed Jan. 30, 2015 to Office Action Mailed Sep. 22, 2014", W/ English Claim chart, 2 pgs.
"Swedish Application Serial No. 1350906-2, Office Action mailed Feb. 19, 2015", w/ English Translation, 32 pgs.
"Transmission mode and DCI content for Release 11", Renesas Mobile Europe Ltd, ingar i: 3GPP TSG-RAN WGI Meeting #69, R1-122357, Prague, Czech Republic, (May 12, 2012).
"UE assumption on colocation of antennas", Renesas Mobile Europe Ltd, ingar i: 3GPP TSG-RAN WG 1 Meeting #69, R 1-122334, Prague, Czech, Republic, (May 12, 2012).
"U.S. Appl. No. 13/706,098, Preliminary amendment filed Sep. 12, 2013", 8 pgs.
"U.S. Appl. No. 14/125,706, Preliminary Amendment filed Dec. 12, 2013", 14 pgs.
"U.S. Appl. No. 14/125,749, Preliminary Amendment filed Dec. 12, 2013", 8 pgs.
"U.S. Appl. No. 14/127,830, Preliminary Amendment filed Dec. 19, 2013", 12 pgs.
"Belgium Application Serial No. 2013/0503, Belgium Search Report mailed Jul. 19, 2013", 9 pgs.
"Evolved Universal Terrestrial Radio Access (E-UTRA); Physical layer procedures", 3GPP TS 36.213 V10.6.0. Technical Specification Group Radio Access Network. Release 10., (Jun. 2012), 1-125.
"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.
"Evolved Universal Terrestrial Radio Access (E-UTRA); User Equipment (UE) procedures in idle mode", 3GPP TS 36.304 V11. 1.0. Technical Specification Group Radio Access Network. (Release 11)., (Sep. 2012), 33 pgs.
"French Application Serial No. 1357011, Office Action mailed Nov. 26, 2013", 2 pgs.
"HARQ-ACK PUCCH Resources in Response to ePDCCH Detections", R1-122259, 3GPP TSG RAN WG1 #69. Prague, Czech Republic. Samsung., (May 21, 2012), 2 pgs.
"HARQ-ACK Transmission in Response to E-PPDCCH Detection", R1-120193, 3GPP TSG RAN WG1 #68. Samsung., (Feb. 2012), 3 pgs.
"International Application Serial No. PCT/US2013/044756, International Search Report mailed Nov. 15, 2013", 3 pgs.
"International Application Serial No. PCT/US2013/044756, Written Opinion mailed Nov. 15, 2013", 4 pgs.
"International Application Serial No. PCT/US2013/061379, International Search Report mailed Jan. 2, 2014", 3 pgs.
"International Application Serial No. PCT/US2013/061379, Written Opinion mailed Jan. 2, 2014", 7 pgs.
"International Application Serial No. PCT/US2013/062132, International Search Report mailed Jan. 28, 2014", 3 pgs.
"International Application Serial No. PCT/US2013/062132, Written Opinion mailed Jan. 28, 2014", 6 pgs.
"International Application Serial No. PCT/US2013/062210, International Search Report mailed Feb. 28, 2014", 4 pgs.
"International Application Serial No. PCT/US2013/062210, Invitation to Pay Additional Fees and Partial Search Report mailed Dec. 16, 2013", 7 pgs.
"International Application Serial No. PCT/US2013/062210, Written Opinion mailed Feb. 28, 2014", 13 pgs.
"International Application Serial No. PCT/US2013/062340, International Search Report mailed Jan. 28, 2014", 6 pgs.
"International Application Serial No. PCT/US2013/062340, Written Opinion mailed Jan. 28, 2014", 6 pgs.

(56) References Cited

OTHER PUBLICATIONS

"International Application Serial No. PCT/US2013/062379, International Search Report mailed Jan. 6, 2014", 6 pgs.
"International Application Serial No. PCT/US2013/062379, Written Opinion mailed Jan. 6, 2014", 7 pgs.
"International Application Serial No. PCT/US2013/062427, International Search Report mailed Jan. 6, 2014", 3 pgs.
"International Application Serial No. PCT/US2013/062427, Written Opinion mailed Jan. 6, 2014", 6 pgs.
"PUCCH Resource Allocation Corresponding to ePDCCH", R1-120666, 3GPP TSG RAN WG1 Meeting #68. ASUSTEK., (Feb. 2012), 2 pgs.
"PUCCH resource allocation for E-PDCCH", R1-120329, 3GPP TSG RAN1 #68. Pantech., (Feb. 2012), 2 pgs.
"PUCCH resource for ePDCCH", R1-123266, 3GPP TSG RAN WG1 Meeting #70. Qingdao, China. Sharp., (Aug. 13, 2012), 8 pgs.
"PUCCH resource mapping with ePDCCH", R1-114066, 3GPP TSG RAN WG1 Meeting #67. Alcatel-Lucent Shanghai Bell, Alcatel-Lucent., (Nov. 2011), 2 pgs.
Davies, Thomas, "Linux Ethernet Bonding Driver HOWTO", [Online]. Retrieved from the Internet: <URL: https://www.kernel.org/doc/Documentation/networking/bonding.txt>, (Apr. 27, 2011), 46 pgs.
Hayashi, Toshiki, "Evolved Packet Core (EPC) Network Equipment for Long Term Evolution (LTE)", Fujitsu Sci. Tech. J., vol. 48, No. 1, (Jan. 2011), 17-20.
Je, Hui Won, et al., "Long-Term Channel Information-Based CoMP Beamforming in LTE-Advanced Systems", 2011 IEEE Global Telecommunications Conference (Globecom 2011), (2011), 1-6.
"U.S. Appl. No. 13/706,098, Final Office Action mailed Feb. 16, 2016", 28 pgs.
"U.S. Appl. No. 13/706,098, Response filed Apr. 15, 2016 to Final Office Action mailed Feb. 16, 2016", 14 pgs.
"U.S. Appl. No. 13/926,273, Final Office Action mailed Jan. 15, 2016", 28 pgs.
"U.S. Appl. No. 13/926,273, Response filed Mar. 15, 2016 to Final Office Action mailed Jan. 15, 2016", 11 pgs.
"U.S. Appl. No. 14/125,706, Notice of Allowance mailed Feb. 2, 2016", 10 pgs.
"U.S. Appl. No. 14/125,749, Corrected Notice of Allowance mailed Feb. 9, 2016", 2 pgs.
"U.S. Appl. No. 14/127,830, Examiner Interview Summary mailed Mar. 24, 2016", 3 pgs.
"U.S. Appl. No. 14/127,830, Non Final Office Action mailed Jan. 20, 2016", 13 pgs.
"U.S. Appl. No. 14/127,830, Response filed Mar. 23, 2016 to Non Final Office Action mailed Jan. 20, 2016", 18 pgs.
"U.S. Appl. No. 14/757,660, Preliminary Amendment filed Mar. 3, 2016", 5 pgs.
"U.S. Appl. No. 15/086,558, Preliminary Amendment filed Apr. 1, 2016", 9 pgs.
"Chinese Application Serial No. 201380044760.6, Voluntary Amendment filed Jan. 7, 2016", W/ English claims, 5 pgs.
"Design of PDSCH muting for CSI-RS in LTE-Advanced", 3G PP TSG RAN WG1 Meeting #62bis R1-105223, (Oct. 4, 2010), 1-5 pgs.
"European Application Serial No. 13841050.1, Extended European Search Report mailed Mar. 23, 2016", 10 pgs.
"European Application Serial No. 13841346.3, Extended European Search Report mailed Mar. 3, 2016", 8 pgs.

"HARQ-ACK PUCCH Resources in Response to E-PDCCH Detections", Samsung, R1-121647, 3GPP, (Mar. 20, 2012).
"Japanese Application Serial No. 2015-516247, Office Action mailed Feb. 9, 2016", W/ English Translation, 4 pgs.
"Japanese Application Serial No. 2015-528730, Response filed Feb. 22, 2016 to Office Action mailed Nov. 4, 2015", (English Translation of Claims), 12 pgs.
"Japanese Application Serial No. 2015-534731, Notice of Reasons for Rejection mailed Mar. 1, 2016", W/ English Translation, 8 pgs.
"Remaining Issues on Resource Allocation for TDD PUCCH format 3", LG Electronics, R1-111692, 3GPP, (May 3, 2011).
"Views on PUCCH Resource Allocation for ePDCCH", NTT DOCOMO, R1-123554, 3GPP, (Aug. 5, 2012).
"WF on PUCCH Format 1a/1b resource allocation for ePDCCH based HARQ-ACKs", Sharp, Nokia Siemens Networks, Nokia, Samsung, Docomo, WF R1-123975, 3GPP, (Aug. 17, 2012).
Alcatel-Lucent, Shanghai Bell, "Further Discussion of Quasi-colocated antenna ports", 3GPP TSG-RAN1 Meeting #69 R1-122458, (May 13, 2012), 1-3 pgs.
"U.S. Appl. No. 13/706,098, Examiner Interview Summary mailed Oct. 28, 2015", 3 pgs.
"U.S. Appl. No. 13/706,098, Response filed Oct. 21, 2015 to Non Final Office Action mailed Jun. 4, 2015", 14 pgs.
"U.S. Appl. No. 13/926,273, Response filed Sep. 30, 2015 to Non Final Office Action mailed Apr. 30, 2015", 11 pgs.
"U.S. Appl. No. 13/930,669, Notice of Allowance mailed Oct. 13, 2015", 5 pgs.
"U.S. Appl. No. 14/125,706, Non Final Office Action mailed Sep. 30, 2015", 22 pgs.
"U.S. Appl. No. 14/125,749, Notice of Allowance mailed Dec. 24, 2015", 10 pgs.
"U.S. Appl. No. 14/125,749, Response Filed Dec. 9, 2015 to Non Final Office Action mailed Sep. 10, 2015", 10 pgs.
"Chinese Application Serial No. 201380043775.0, Preliminary Amendment filed Oct. 19, 2015", W/ English Claims, 14 pgs.
"Chinese Application Serial No. 201380045631.9, Preliminary Amendment filed Oct. 20, 2015", W/ English Claims, 27 pgs.
"European Application Serial No. 13819538.3, Extended European Search Report mailed Dec. 23, 2015", 8 pgs.
"European Application Serial No. 13819538.3, Office Action mailed Mar. 5, 2015", 2 pgs.
"European Application Serial No. 13819538.3, Response filed Sep. 9, 2015 to Office Action mailed Mar. 5, 2015", 9 pgs.
"Japanese Application Serial No. 2015-528730, Office Action mailed Nov. 4, 2015", W/ English Translation, 11 pgs.
"Netherlands Application Serial No. 2011185, Response filed Aug. 3, 2015 to Office Action mailed May 27, 2015", W/ English Claims, 9 pgs.
"Spanish Application Serial No. P201331103,Response filed Jun. 22, 2015 to Office Action mailed Apr. 28, 2015", W/ English Claims, 19 pgs.
"Swedish Application Serial No. 1350906-2, Response filed May 19, 2015 to Office Action mailed Feb. 19, 2015", W/ English Claims, 17 pgs.
"Taiwanese Application Serial No. 102125395, Response filed Sep. 21, 2015 to Office Action mailed Jun. 22, 2015", W/ English Claims, 28 pgs.
"Taiwanese Application Serial No. 102125395, Response filed Oct. 16, 2015 to Office Action mailed Jun. 22, 2015", W/ Partial English Claims, 6 pgs.

* cited by examiner

| INFORMATION ELEMENTS | |
|---|---|
| UE IDENTITY | CHOICE |
| | S-TMSI |
| | RANDOM VALUE |
| ESTABLISHMENT CAUSE | CHOICE |
| | EMERGENCY |
| | HIGH PRIORITY ACCESS |
| | MOBILE TERMINATING ACCESS |
| | MOBILE ORIGINATING SIGNALLING |
| | MOBILE ORIGINATING DATA |
| | MOBILE ORIGINATING ACCESS WITH ALWAYS-ON S1-U INDICATOR |
| | MOBILE TERMINATING ACCESS WITH ALWAYS-ON S1-U INDICATOR |

ALWAYS-ON BEARER FOR SMALL DATA TRANSFERS IN LTE SYSTEMS

PRIORITY CLAIM

This application is a U.S. National Stage Application under 35. U.S.C. 371 from International Application No. PCT/US2013/062379, filed Sep. 27, 2013, which claims the benefit of priority to U.S. Provisional Patent Application Ser. No. 61/707,784, filed on Sep. 28, 2012, each of which are incorporated herein by reference in their entireties.

TECHNICAL FIELD

Embodiments described herein relate generally to wireless networks and communications systems.

BACKGROUND

In LTE (Long Term Evolution) cellular systems, as set forth in the LTE specifications of the 3rd Generation Partnership Project (3GPP), mobile terminals (where a terminal is referred to in LTE systems as user equipment or UE) connect to a base station (referred in LTE systems as an evolved Node B or eNB) that provides connectivity for the UE to other network entities of the LTE system that connect to an external network such as the internet. Providing such network connectivity involves the setting up of bidirectional data pathways, referred to as bearers, between the different components of the LTE system. These bearers are set up when the UE transitions from an idle state to a connected state and, for reasons of efficiency, are torn down when the UE is idle. Some UE applications, however, may involve frequent small data transfers where the UE transitions to an idle state after each such transfer. Repeatedly setting up and tearing down the bearers in these situations leads to a great deal of signaling overhead. Reducing that signaling overhead is an objective of the present disclosure.

BRIEF DESCRIPTION OF THE DRAWINGS

FIG. 3 illustrates an example of an RRC Connection Request with an always-on indicator.

DETAILED DESCRIPTION

The high-level architecture of an LTE may be described as including three main components: user equipment (UE), the evolved UMTS terrestrial radio access network (E-UTRAN) and the evolved packet core (EPC), where the E-UTRAN together with the EPC are referred to as the EPS (evolved packet system). A UE may be a cellular phone or other device that communicates wirelessly with the E-UTRAN, which is made up of a single component, the evolved Node B (eNB). The eNB communicates with the EPC which, in turn, communicates with packet data networks in the outside world such as the internet.

Figure 1:
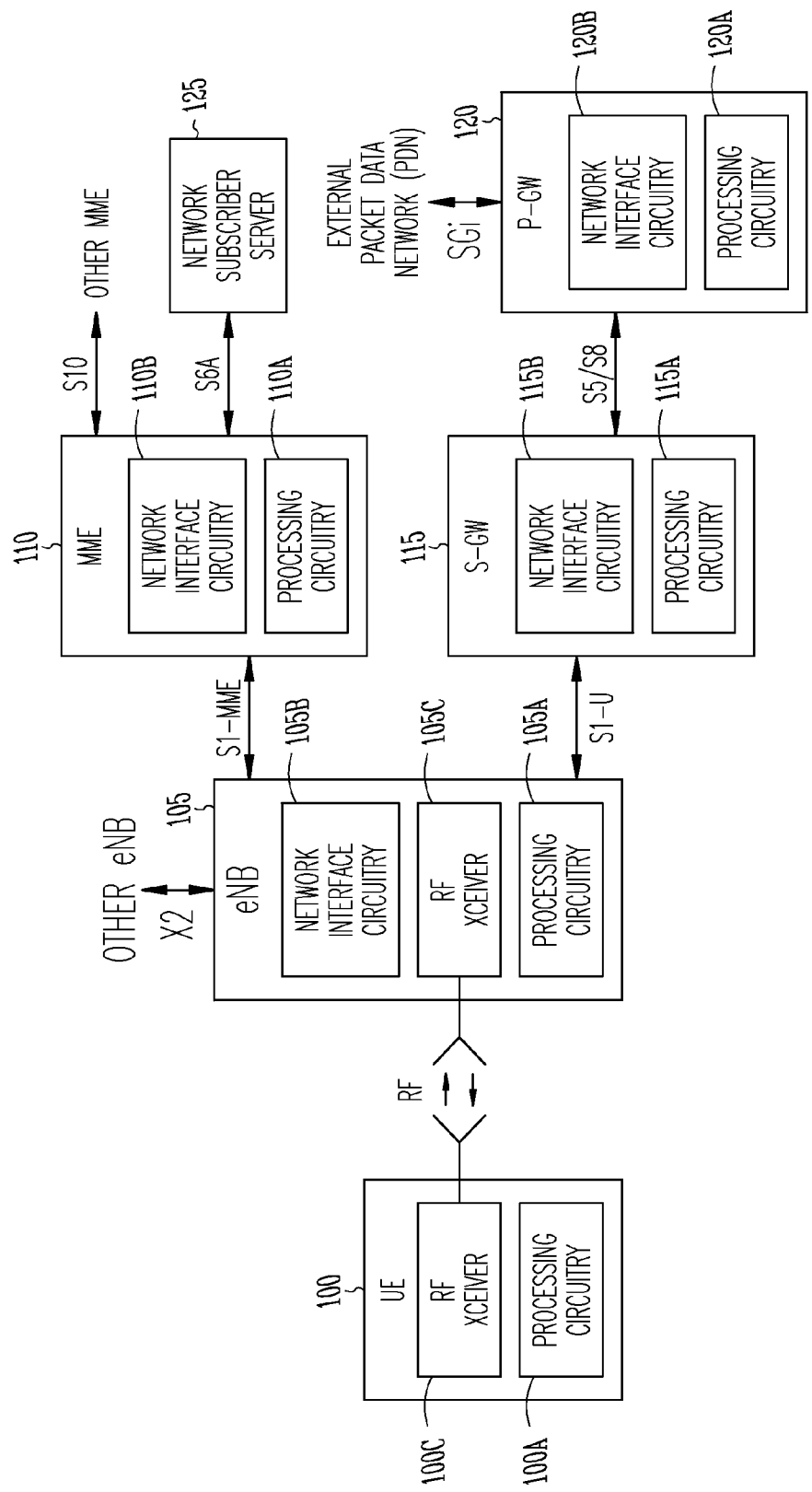
FIG. 1 illustrates the primary network entities of an LTE system.

FIG. 1 illustrates the primary network entities of an LTE system where a particular entity may include processing circuitry designated by an "a" suffixed to its reference numeral, network interface circuitry designated by a "b" suffixed to its reference numeral, and a radio-frequency (RF) transceiver with one or more antennas designated by an "c" suffixed to its reference numeral. The eNB 105 provides an RF communications link for the UE 100, sometimes referred to as the LTE radio or air interface. The eNB is a base station that serves the UEs one or more geographic areas called cells. A UE communicates with one eNB at a time and, as the UE moves, may switch to another eNB in a procedure known as handover. The eNB provides uplink and downlink data channels for all of the UEs in its cells and relays data traffic between the UE and the EPC. The eNB also controls the low-level operation of the UEs by sending them signaling messages. The main components of the EPC are shown as an MME 110 (mobility management entity), an HSS 125 (home subscriber server), an S-GW 115 (serving gateway), and P-GW 120 (packet data network (PDN) gateway). The MME controls the high-level operation of the UE including management of communications sessions, security, and mobility. Each UE is assigned to a single serving MME that may change as the UE moves. The HSS is a central database that contains information about all the network operator's subscribers. The P-GW is the EPC's point of contact with the outside world and exchanges data with one or more packet data networks such as the internet. The S-GW acts as a router between the eNB and P-GW. As with the MME, each UE is assigned to a single serving S-GW that may change as the UE moves.

The air interface provides a communications pathway between the UE and eNB. Network interfaces provide communications pathways between the eNB and the EPC and between the different components of the EPC. The network interfaces include an S1-MME interface between the eNB and the MME, an S1-U interface between the eNB and the S-GW, an X2 interface between different eNBs, an S10 interface between different MMEs, an S6a interface between the MME and the HSS, an S5/S8 interface between the S-GW and the P-GW, and an SGi interface between the P-GW and the PDN. These network interfaces may represent data that is transferred over an underlying transport network.

At a high level, the network entities in FIG. 1 communicate across the interfaces between them by means of packet flows, referred to as bearers, which are set up by specific protocols. The UE and eNB communicate over the air interface using both data radio bearers and signaling radio bearers (SRBs). The eNB communicates with the MME over the S1-MME network interface and with the S-GW over the S1-U network interface with like-named bearers (the S1-MME bearer may also be referred to as the S1-AP (S1 application protocol) bearer). The combination of a data radio bearer, an S1-U bearer, and an S5/S8 bearer is called an EPS bearer. The EPC sets up one EPS bearer known as the default bearer whenever a UE connects to the PDN. A UE may subsequently receive other EPS bearers called dedicated bearers.

Each of the interfaces discussed above is associated with a protocol stack that the network entities use to either exchange data. The protocols in LTE are divided into user plane protocols and control plane protocols. The user plane carries user data through what is called the AS (access stratum) and includes protocols for the air interface between the UE and the eNB, the S1-U interface between the eNB and the S-GW, and the S5/S8 interface between the S-GW and the P-GW. The user plane parts of the S1-U and S5/S8 interfaces use the GTP protocol (GPRS (general packet radio service) tunneling protocol) for transporting IP packets. GTP encapsulates the original IP packet to ensure that packets flow between the UE and the proper eNB.

The control plane is responsible for controlling the connections between the UE and the network and includes a protocol stack for the air interface between the UE and eNB, at the top of which is the RRC (radio resource control) protocol. The RRC is the main controlling protocol for the AS, being responsible for establishing radio bearers and configuring lower layers using RRC signaling between the eNB and the UE. The control plane protocols that run between the UE and the MME, and which lie above the RRC in the UE, are referred to as the NAS (non-access stratum) protocols and include the EMM (EPS mobility management) protocol and the ESM (EPS session management protocol). The NAS protocols are used by the MME to manage the connectivity of the UE with the EPC. Because the NAS protocols do not exist in the eNB, RRC and S1-AP (S1 application protocol) are used as transport protocols for NAS messages between the UE and the eNB and between the eNB and MME, respectively.

In the current 3GPP LTE architecture, a UE performs several steps for attaching itself to the EPS. First, it establishes an RRC connection with the eNB to set up SRBs (signaling radio bearers), moving from what is called RRC_IDLE state to RRC_CONNECTED state. After establishing the RRC connection, the UE sets up the S1-MME bearer. Subsequently, the S5/S8, S1-U, and radio bearers are set up to form the EPS bearer. This attachment to the network happens on a per UE basis and involves the creation of a number different data tunnels. When the UE enters the RRC_IDLE state, only the S5/S8 EPS bearer context is retained, and the S1-U, S1-AP and radio bearers are released. These bearers have to be re-established on per UE basis when the UE returns to RRC_CONNECTED state. A number of UE applications may send small data frequently, which causes the UE to toggle between IDLE and CONNECTED states. This leads to a great deal of signaling overhead as the radio bearer and the S1-U bearer must be frequently re-established as the UE transitions between IDLE to CONNECTED states.

Always-on S1-U Bearer

Figure 2:
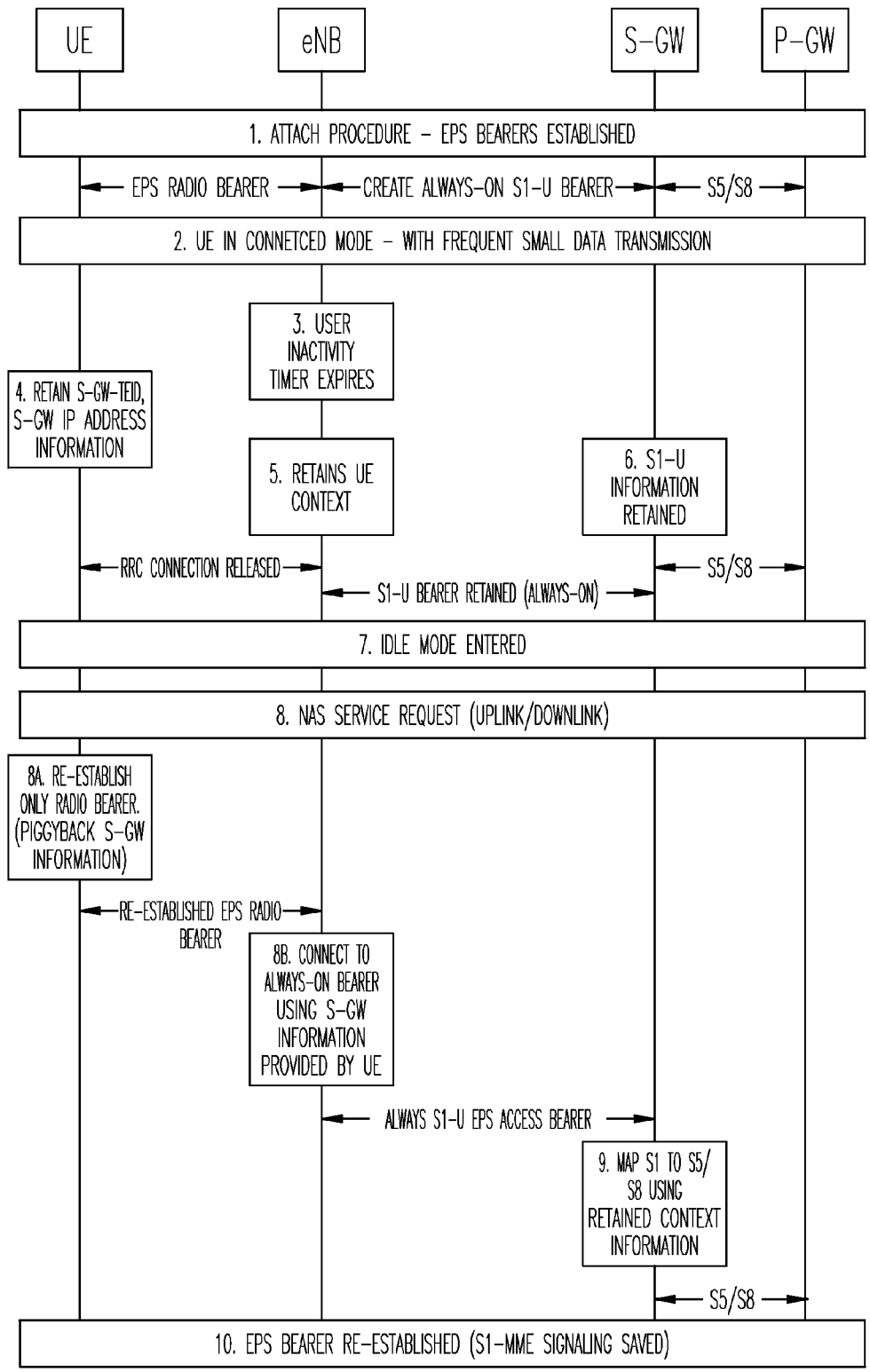
FIG. 2 illustrates an example of the operation of an always-on S1-U bearer that saves S1-MME signaling.

A solution to avoid much of the overhead signaling while re-establishing tunnels is to have a default, always-on S1-U bearer. When the UE enters RRC_IDLE mode, the associated S1-U information can be maintained so that there is no need to re-establish the S1-U bearer when the UE wakes up from IDLE state. That is, when a UE in an RRC_IDLE state transitions to the RRC_CONNECTED state, it only needs to establish the radio bearer, and S1-MME signaling is not necessary. The scheme according to one embodiment is illustrated in FIG. 2 as stages 1 through 10 that involve the UE, eNB, S-GW, and P-GW. Stage 1 is the Attach procedure for the UE that creates the EPS bearer which is made up of a radio bearer, an S5/S8 bearer, and an always-on S1-U bearer. At stage 2, the UE is in connected mode and is running an application with frequent small data transmissions. At stage 3, a user inactivity timer at the eNB expires which tells the eNB to put the UE in idle mode. As the RRC connection is released by the eNB, the UE retains the S-GW IP (internet protocol) address and the S-GW TIED (tunnel endpoint identifier for the always-on S1-U bearer at stage 4. The eNB retains the UE context at stage 5, and the S-GW retains information about the always-on S1-U bearer at stage 6 as well as maintaining the S5/S8 bearer. The UE enters the idle mode at stage 7. At stage 8, the UE issues an NAS service request to the eNB (e.g., because it has data to send) and piggybacks the retained S-GW information in the message to the eNB. The radio bearer is re-established at stage 8a, and the eNB uses the piggybacked S-GW information to connect the radio bearer to the always-on S1-U bearer at stage 8b. At stage 9, the S-GW maps the always-on S1-U bearer to the S5/S8 bearer at stage 9 using the retained context information. The EPS bearer is thus re-established at stage 10 with no S1-MME signaling involved.

Modification of Call Flows

Described below are modifications to existing call flows in order to realize the concept of an always-on-S1-U bearer. Modifications are described for the Attach procedure, the S1-Release procedure, the Service Request procedure, the S-GW Relocation procedure, and Handover procedures. Both the eNB and the MME need to be made aware when the UE requests an always-on S1-U bearer. In one embodiment, the eNB is informed with an "always-on indicator" in RRC signaling. The RRC Connection Request message includes a UE identity and an establishment cause. A new establishment cause, the always-on S1-U indicator, is introduced in order to indicate that the UE wants to create an always-on S1-U bearer as shown in FIG. 3 which lists the IEs (information elements) of the RRC Connection Request message. This always-on indicator informs the eNB that the S1-U bearer is a static, always-on bearer and that the eNB should not delete the UE context during an S1-Release procedure. The added establishment cause provides an indication of the request for the always-on S1-U bearer for either mobile originating access or mobile terminating access.

The MME may be made aware of a UE request for an always-on S1-U bearer by having the eNB, after receiving the UE request for S1-U bearer as described above, forward the always-on indicator in the S1-AP Initial UE message, as part of the "RRC Establishment Cause" information element. Alternatively, NAS messages can also be used to convey to the MME that it has to establish an always—on S1-U bearer. With regard to the Attach Request message, the new indicator may be signaled in one of the following ways: 1) the field EPS Attach Type, used to indicate the type of the requested attach, can be enhanced to indicate the new attach type with an S1-U always-on bearer; 2) and an additional Update Type IE can be used to indicate a new attach type with an S1-U always-on bearer, or 3) a new IE in the Attach Request message can be defined. Similarly other NAS messages such as service request or tracking area update request can include the always on S1-U indication. The MME, upon on receiving NAS request with always-on S1-U indication is informed that an always-on bearer is going to be established so that the MME does not delete the UE context information during an S1 release.

Enhancements to Attach Procedure

The attach procedure described in 3GPP TS 23.401, section 5.3.2 may be suitably modified to facilitate the creation of an always-on bearer for applications using the always-on indicator, including MTC (machine type communications) applications. In one embodiment, a UE can initially indicate that it needs an always-on bearer as it sends/receives small data frequently. This indication can either be piggybacked on an RRC Connection Request message or on an Attach Request message. This indication informs the eNB not to delete the UE context during the S1-release. The same indication may also be sent to the MME and the S-GW in order to retain UE context and EPS bearer information when an always on S1-U bearer is requested.

In one embodiment, the MME is allowed to validate the need for an always-on S1-U bearer. Depending on the user profile or other user behavior, the network operator may optionally configure optimized Attach (using always-on S1-U) in a user's subscription profile in the HSS. If activated, this parameter is downloaded to the MME as part of the update location procedure. Before the MME sends the Create Session Request message to the S-GW to create the always on bearer, it verifies the subscription data in HSS and confirms the need for an always-on bearer as shown in Stage 11 of FIG. 4A.

In one embodiment, the S-GW is informed of always-on S1-U bearer in the following way. The MME selects an S-GW and allocates an EPS Bearer Identity for the Default Bearer associated with the UE. Then it sends a Create Session Request message to the selected S-GW. The Request type is set as one with an always-on S1-U bearer. This informs the S-GW that an always-on bearer has been created and to retain the context when the UE goes into IDLE mode. The TEID used by the S-GW on the S1-U interface (referred to as the "SGW TEID") may be assigned in either of the following ways: 1) If the always-on bearer is supported only for low mobility UEs, the S-GW TEID is assigned in the usual way, i.e. so that its value is unique on a given S1-U interface; or 2) If the always-on bearer is supported in conjunction with UE mobility, the S-GW TEID is assigned in such a way that its value is unique across all S1 interfaces served by the same S-GW. As explained below, this special way of S-GW TEID assignment enables the SGW to identify the always-on bearer for a specific user plane packet, regardless of the S1 instance on which this user plane packet was received.

In some embodiments, the UE is also informed of the S-GW TEID and S-GW IP address. This may be needed only if the always-on bearer is supported in conjunction with UE mobility. Some information about the S1 always-on bearer (namely, the SGW IP address and the SGW TEID assigned to the always-on bearer) is signaled to the UE via AS (access stratum) or NAS signaling. For example, the RRC Connection Reconfiguration message may be used to piggyback the S-GW TEID and the S-GW IP address to the UE or, alternatively, the information can be piggybacked in the Attach Accept message by the MME. The UE stores the information and passes it to eNB when it changes from IDLE to CONNECTED mode. The eNB then uses this information to identify and connect to the S-GW that "owns" the always-on S1-U bearer. It is important that the UE stores this information because the eNB which has retained the UE context may change if the UE is mobile (but new eNB may still have the same S-GW).

Figure 4A:
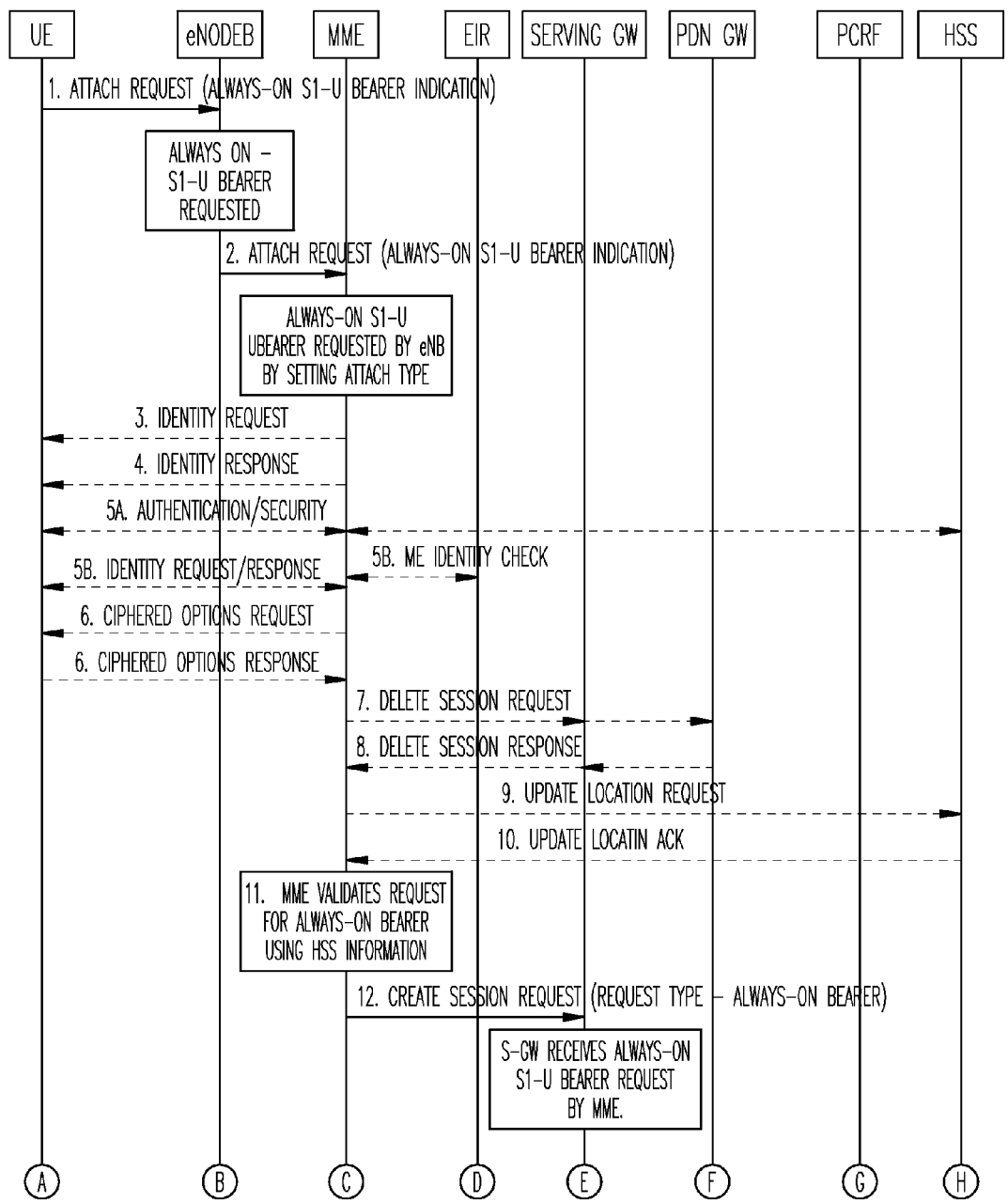
FIGS. 4A and 4B illustrate an example of an enhanced Attach procedure for an always-on S1-U bearer.
Figure 4B:
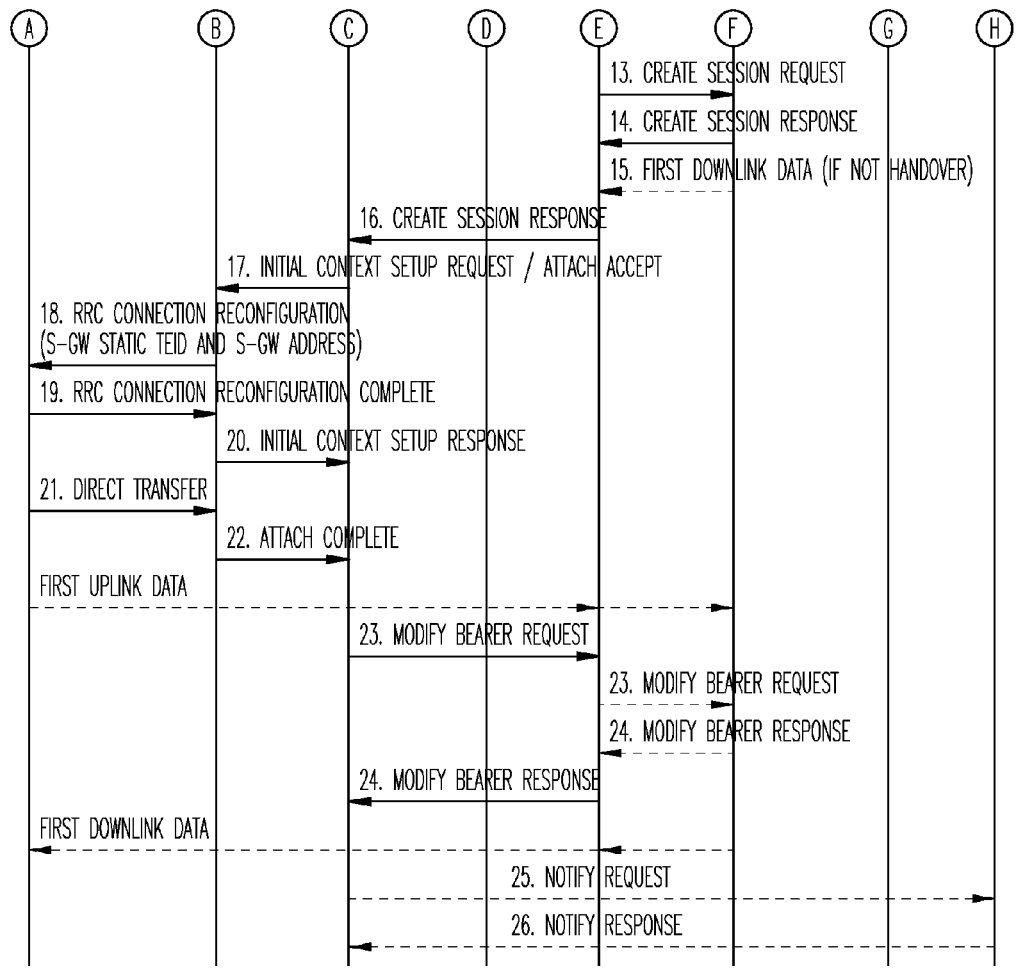

FIGS. 4A and 4B illustrate an enhanced attach procedure to obtain an always-on S1-U bearer according to one embodiment made up of stages 1 through 26. At stage 1, the UE sends an Attach Request message to the eNB with an always-on bearer requested which is forwarded to the MME at stage 2. The always-on S1-U bearer may be requested by the eNB by setting the Attach Type. Identity Request and Identity Response messages are sent between the UE and the MME at stages 3 and 4. Authentication/Security, Identity Check, and Ciphered Options procedures take place at stages 5a-b and 6. At stages 7 and 8, the MME sends a Delete Session Request message to the P-GW and receives a Delete Session Response message in return in order to tear down the previous bearer. At stages 9 and 10, the MME sends an Update Location Request message to the HSS and receives an Update Location Response in return so that it can validate the request for an always-on S1-U bearer using the HSS information at stage 11. At stage 12, the MME sends a Create Session Request message to the S-GW with a Request Type set to always-on S1-U bearer, and the message is forwarded to the P-GW at stage 13. A Create Session Response message is received by the S-GW at stage 14 along with downlink data at stage 15 (if no handover has occurred), and the response is forwarded to the MME at stage 16. The MME next sends Initial Context Setup Request and Attach Accept messages to the eNB at stage 17. At stage 18, the eNB sends an RRC Connection Reconfiguration message to the UE that also informs the UE of the S-GW IP address and S-GW TEID for the always-on bearer. At stage 19, the UE sends an RRC Reconfiguration Complete message to the eNB. The eNB sends an Initial Context Setup Complete message to the MME at stage 20 and an Attach Complete message to the MME at stage 22. At stage 21, the UE sends a Direct Transfer message to the eNB. At stage 23, the MME sends a Modify Bearer Request message to the S-GW which is forwarded to the P-GW. At stage 24, the P-GW sends a Modify Request Response message to the S-GW which is forwarded to the MME. Notify Request and Notify Response messages are exchanged between the MME and the HSS at stages 25 and 26.

Enhancement to S1 Release Procedure

Figure 5:
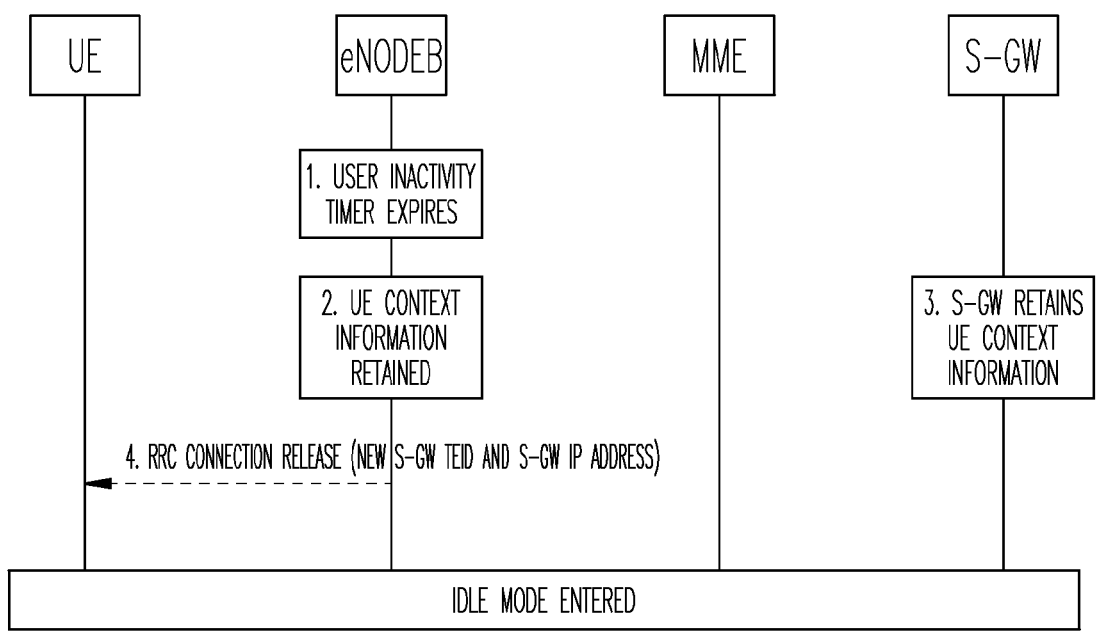
FIG. 5 illustrates an example of an enhanced S1-release message sequence.

An example of an enhanced S1 Release procedure is shown in FIG. 5 that releases only the logical S1-AP signaling connection (over S1-MME). At stage 1, the user inactivity timer at the eNB expires to initiate the procedure. The UE context information is retained by the eNB and S-GW at stages 2 and 3, respectively. The eNB sends the UE an RRC Connection Release message at stage 5. After this procedure is complete, the UE moves from ECM-CONNECTED state to ECM-IDLE state. The UE related context information is retained at the eNB, MME and S-GW, as they are informed of the always on S1-U bearer during the Attach procedure described above.

Figure 6:
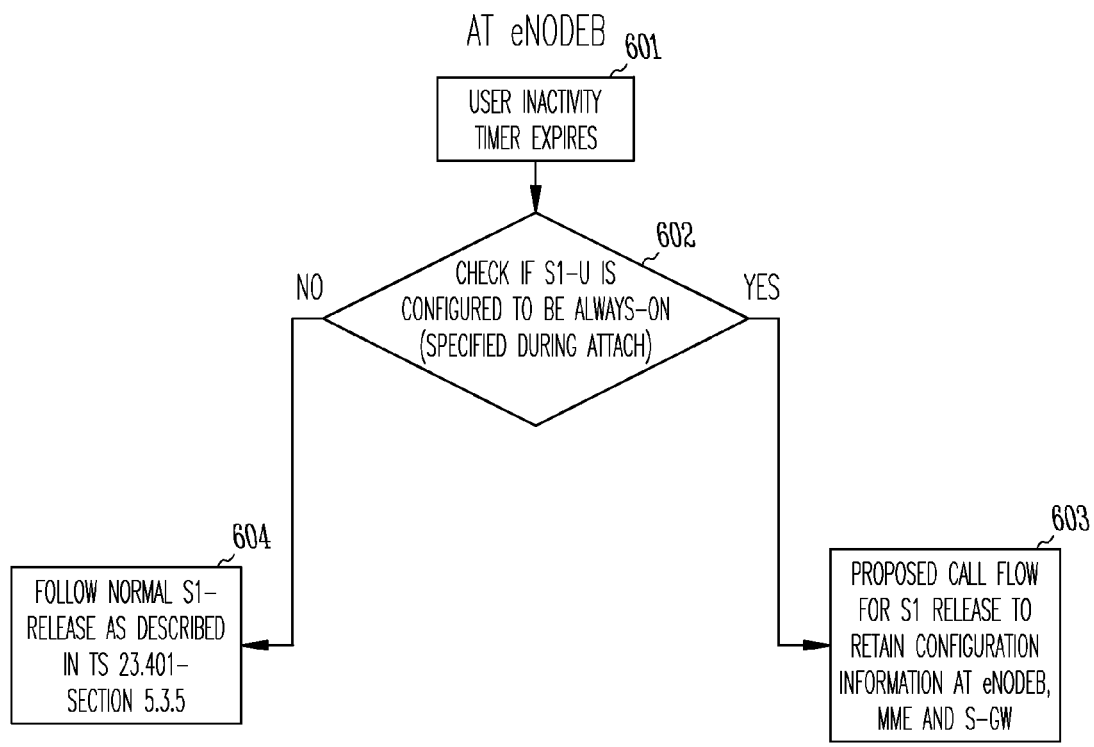
FIG. 6 illustrates an example of an S1 release call flow decision.

In one embodiment, as illustrated by FIG. 6, when the user inactivity timer expires at the eNB at state 601, it checks whether the bearer established is an always-on S1-U bearer at stage 602. If so, then at stage 603, the eNB retains the UE context information, and the S-GW also retains the configuration details along with mapping details to the S5/S8 bearer. Otherwise, at stage 604, it follows the normal release procedure as described in 3GPP TS 23.401, section 5.3.5.

The RRC Connection Release message is sent to the UE in order to release the RRC connection between the UE and the eNB. In case a handover has occurred, and the eNB has changed with an S-GW relocation, then the eNB can piggyback the new S-GW IP address and S-GW TEID using the RRC Connection Release message. The UE retains the S-GW TEID and S-GW IP address and supplies this information to the eNB in a Service Request message to connect to the always-on bearer, without any MME signaling needed.

Enhanced Tracking Area Update Procedure with S-GW Relocation

Figure 7:
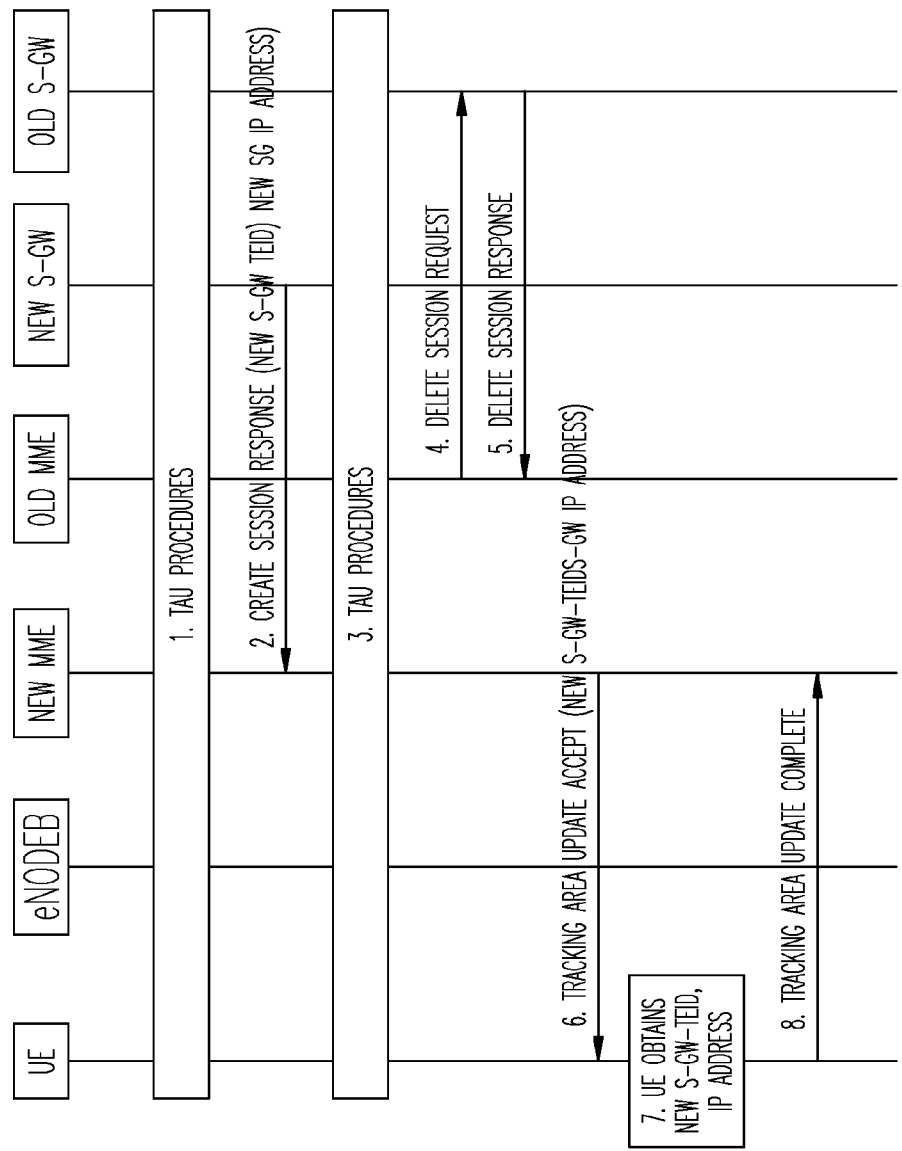
FIG. 7 illustrates an example of a Tracking Area Update with S-GW relocation.

An enhanced Tracking Area Update procedure according to one embodiment is illustrated by FIG. 7. TAU (tracking area update) procedures are performed at stages 1 and 3. When a Tracking Area Update occurs with S-GW change, then the new S-GW sends a Create Session Response message to the new MME at stage 2 which includes a new S-GW address and new S-GW TEID for user plane and P-GW TEIDs (for S5/S8) for uplink traffic. This needs to be relayed to the UE so that the S-GW TEID and IP address is updated at the UE to facilitate connection to the always on tunnel Before the UE is informed of the addresses, the old session is first deleted. The old MME sends the old S-GW a Delete Session Request message at stage 4 and receives a Delete Session Response at stage 5. Then the new S-GW IP address and S-GW TEID are piggybacked and sent through the Tracking Area Update Accept message at stage 6. The UE obtains the new S-GW IP address and S-GW TEID at stage 7, and sends the new MME a Tracking Area Update Complete message at stage 8.

Enhanced Service Request Procedures for Always-on S1-U Bearer

Figure 8:
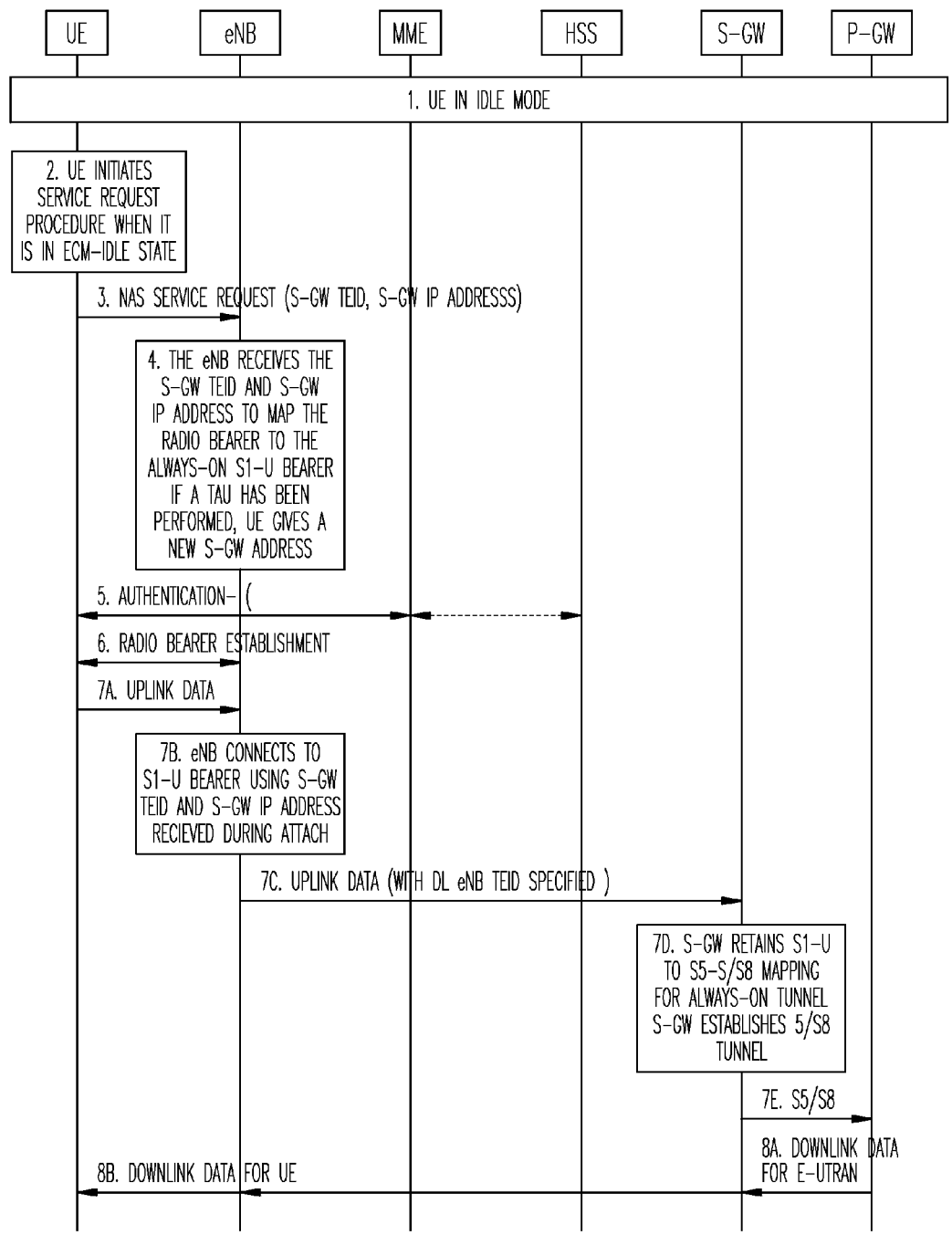
FIG. 8 illustrates an example of a modified Service Request.

When an always-on bearer is used, a modified service request procedure can be used in order to attach to the network when the UE goes to the CONNECTED mode. An example of an enhanced Service Request procedure that saves S1-MME signaling according to one embodiment is illustrated by FIG. 8. At stage 1, the UE is in the IDLE mode after following the S1-Release procedure for the always on tunnel as described above. The UE initiates the Service Request while it is in the ECM-IDLE state at stage 4. An NAS Service Request message is sent from the UE to the eNB when the UE has to change from EMM_IDLE to EMM_REGISTERED mode. This message is sent when the UE is paged by the MME when there is downlink data or when there is UE initiated uplink data. At stage 3, the UE sends a NAS message Service Request to the eNB encapsulated in an RRC message. If the UE uses an always-on S1-U bearer, then it sends the S-GW TEID and the S-GW IP address to the eNB piggybacked in this message. Additionally, if a TAU has been performed, then the new S-GW TEID, S-GW address is sent to eNB to update the always on EPS bearer information and to connect to S1-U. At stage 4, the eNB receives the S-GW IP address and S-GW TEID and maps the radio bearer to the S1-U bearer. The eNB authenticates the UE and performs security related functions at stage 5. The Radio bearer is established between the UE and the eNB at stage 6. At stages 7a and 7b, the eNB connects to the S1-U bearer using the static S-GW TEID and S-GW address. At stage 7c, the eNB sends dummy UL data to inform the DL eNB TEID to S-GW. This can be done by defining a new "message type" from GTP-U header or an existing message such as an Echo Request may be modified. The context of s5/S8 is maintained at the S-GW and the S1-U is mapped to S5/S8 at stages 7d and 7e. End to end tunnels are established, and downlink data is routed to the S-GW and UE using the eNB TEID which is sent during the uplink at stage 8.

Figure 9:
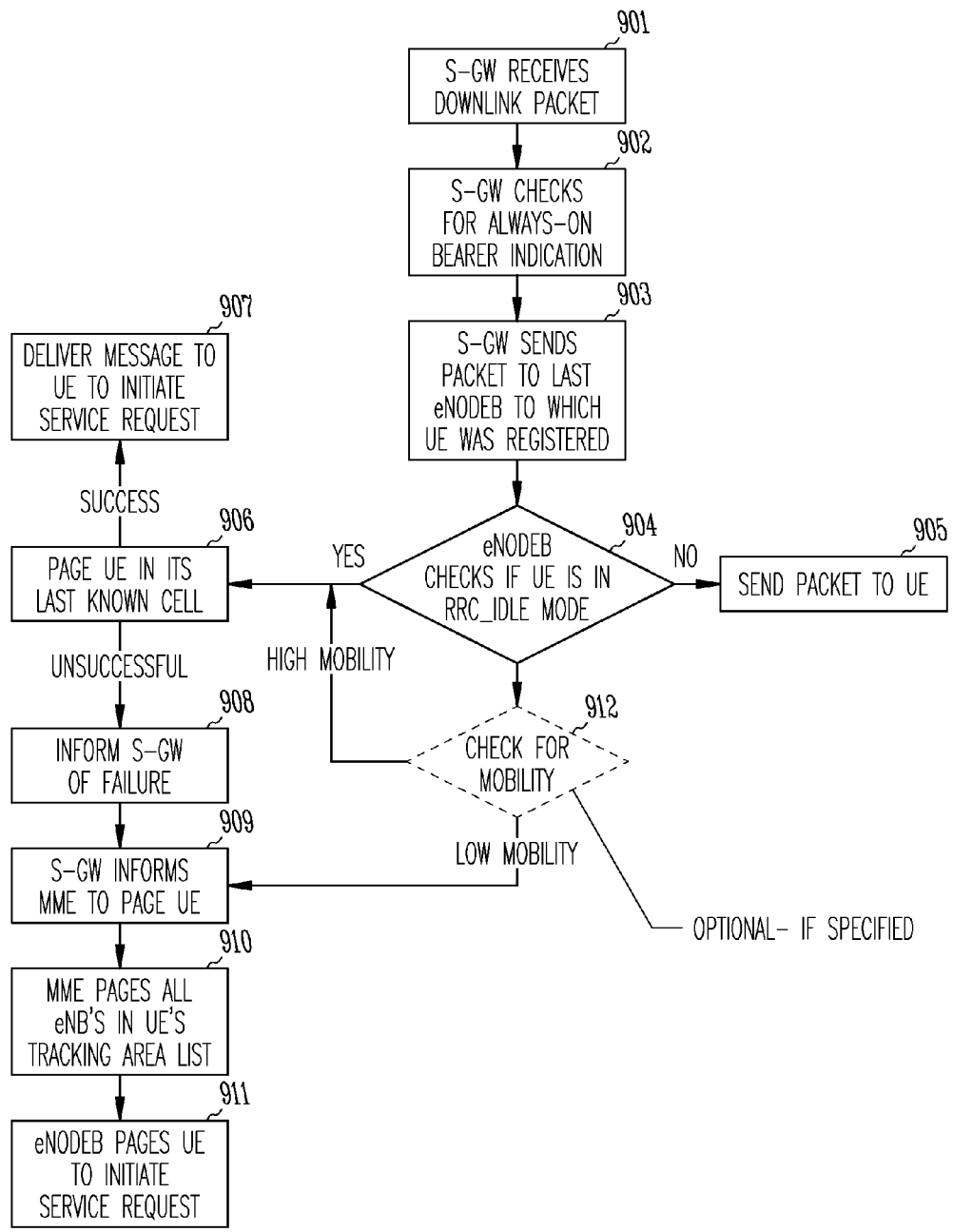
FIG. 9 illustrates an example of a downlink data transfer for an always-on S1-U bearer.

FIG. 9 illustrates paging from eNB/MME on getting downlink data according to one embodiment. When the PDN gateway sends a downlink packet to the UE, the packet is initially buffered at the S-GW at stage 901. The S-GW is informed during the initial attach that the S1-U bearer is always-on and determines that this is the case at stage 902. The S-GW, on knowing that the S1-U bearer is always-on, sends the packet to the eNB regardless of whether the UE is in IDLE mode or CONNECTED mode at stage 903. At stage 904, the eNB determines whether the UE is in CONNECTED or IDLE mode. If the UE is in CONNECTED mode, the packet is sent at stage 905. If the UE is in IDLE mode, at stage 906, the eNB pages the UE in its last registered cell using IMSI (international mobile subscriber identity) information of the UE and sets an appropriate paging cause. If the UE is still registered with the eNB, it receives the packet at stage 907. If the UE does not respond, the eNB informs S-GW of the failure to deliver the message via a new GTP-U message or via a modified existing message (e.g., an Echo Request) at stage 908. Subsequently, at stage 909, the S-GW requests the MME to deliver the message by paging the UE. The MME, on receiving this request, pages all the eNBs in the UE's Tracking Area List at stage 910, and the eNB to which UE is attached pages the UE to initiate a Service Request at stage 911. Optionally, stage 912 may be performed to check whether the UE is in a high mobility state or low mobility state. If the latter, the eNB can page the UE informing it to initiate a service request. If the UE is highly mobile, on the other hand, the S-GW can send a message to the MME to page the UE instead of asking the eNB to page the UE. Once the UE is informed of the downlink data, the UE initiates the enhanced Service Request procedure described above to register with the network and receive services.

In another embodiment, the S-GW runs an inactivity timer of the same or less value than the eNB inactivity timer. If the timer expires, the S-GW marks the UE as idle. In this case, if S-GW receives any downlink data it will not forward it to eNB and will send a downlink data notification to MME.

Enhanced Call Flow for eNB Relocation with S-GW Relocation

Figure 10:
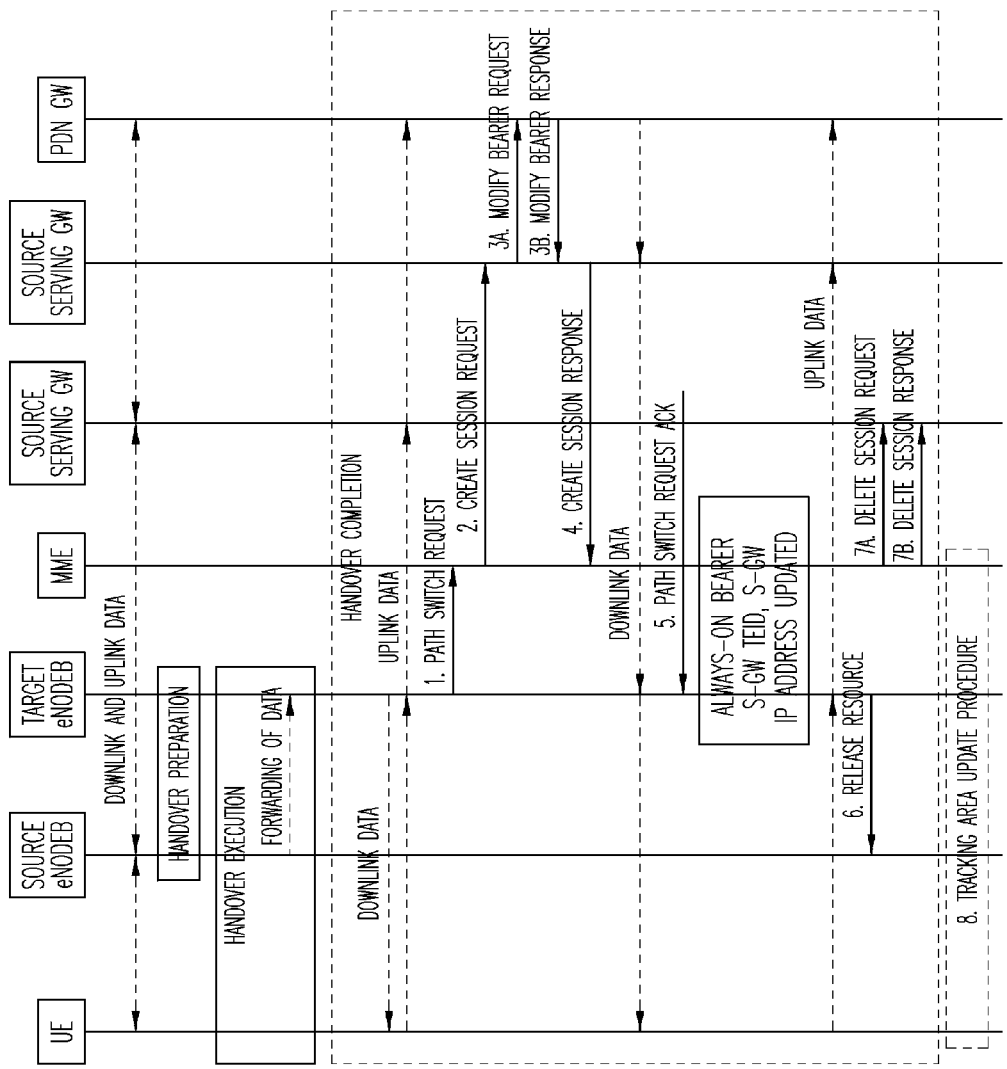
FIG. 10 illustrates an example of an eNB relocation with S-GW relocation.

When eNB relocation occurs with S-GW relocation, the contexts have to be updated at the S-GW, eNB and P-GW in order to facilitate the always-on S1-U bearer. An example embodiment of the stages involved in this process according to one embodiment is illustrated by FIG. 10. After receiving a Path Switch Request at stage 1, the MME sends a Create Session Request message to the Target S-GW with bearer contexts at stage 2. The message includes P-GW addresses, TEIDs for S5/S8, eNB addresses and TEIDs for downlink user plane for the accepted EPS bearers per PDN connection for the default bearers that have been accepted by the target eNB. The target S-GW sends a Modify Bearer Request to the P-GW at stage 3a and receives a Modify Bearer Response in return at stage 3b. At stage 4, the target S-GW sends the MME a Create Session Response message. At stage 5, the MME sends the target eNB a Path Switch Request Acknowledgement message that gives the eNB the S-GW addresses and uplink TEID(s) for user plane message. Stages 6 and 7a-b show a Release Resource message sent by the target eNB to the source eNB and a Delete Session Request sent by the MME to the source S-GW with a Delete Session Response sent in return. A tracking area update procedure is performed at stage 8. The target eNB starts using the new S-GW address and TEID(s) for forwarding subsequent uplink packets. The UE is informed of the new S-GW TEID and S-GW IP address before the S-1 release (before UE goes into IDLE mode) by piggybacking this information in RRC Connection Release message as explained above. The UE can then use the new S-GW information and supply it to the eNB in Service Request message to connect to the always-on bearer, without any signaling needed when it goes from IDLE to CONNECTED mode.

Solutions for Transferring UE and Security Context

When the enhanced Service Request Procedure is performed as described above in order to connect to the always-on bearer, the UE goes from IDLE mode to CONNECTED mode. If the UE has changed its eNB when it was in IDLE mode and connects to a new eNB, then the security context of the UE has to be transferred from the old eNB to the new eNB. Described below are solutions for transferring the security context of the UE from the old eNB to the new eNB when a UE's eNB has changed.

One embodiment is as follows. For a user with low mobility, if the eNB does not change very often, then a normal service request procedure can be performed as described in Section 5.3.4 of 3GPP TS. 23.401. However, the new eNB should send a context release request to old eNB informing it to release the context pertaining to the UE. The UE can indicate that it has Low Mobility state to the eNB in the NAS Service Request. The new eNB, on receiving the Low Mobility indication, uses the ECGI (E-UTRAN cell global identifier), and old eNB IP address to establish an X2 Connection with the old eNB and sends a UE Context Release message. The existing UE Context Release message may be enhanced in order to inform the old eNB to release resources. A new message over the X2 interface, UE Context Release Reply, is created which is used to inform the new eNB of success/failure. Once, the new eNB receives confirmation of deletion of UE context, the normal Service Request procedure continues. Alternatively, context in the old eNB can be released by the S-GW once S1-U is established with the new eNB.

Figure 11:
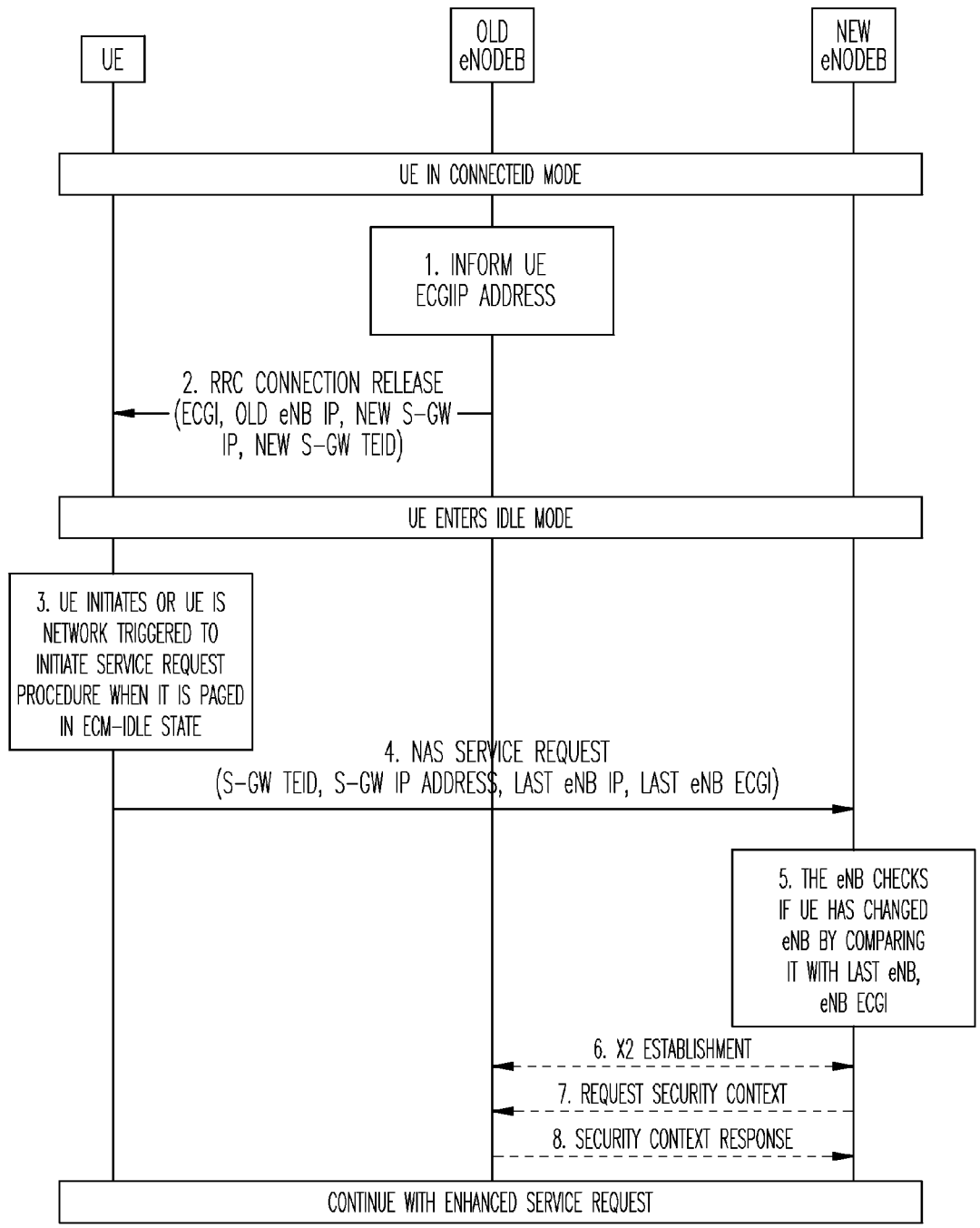
FIG. 11 illustrates an example of transferring security context from an old eNB to a new eNB over the X2 interface.

Another embodiment is as illustrated in FIG. 11. In this solution, the UE transfers the security context from the old eNB to the new eNB using the X2 interface. The UE obtains information about the eNB to which it is last connected to before it goes from CONNECTED mode to IDLE MODE. The UE obtains the ECGI and the IP address of the eNB piggybacked in an RRC Connection Release message at stages 1 and 2. After it enters the IDLE mode, then UE may be mobile and change eNBs. When the UE initiates or when there is a network initiated Service Request at stage 3, the UE connects to the new eNB and piggybacks its last eNB information to the new eNB in the NAS Service Request at stage 4. The new eNB checks if the UE has changed eNBs while in IDLE mode by comparing the ECGI sent by UE with its own ECGI at stage 5. If the E-CGI's differ, then the eNB uses the IP address information of the last eNB and establishes an X2 connection with it at stage 6. The Request Security Context X2 message at stage 7 is defined in order to request the old eNB to handover the relevant security context to the new eNB pertaining to the UE. The Security Context Response message at stage 8 is also defined in order to carry the security context from the old eNB to the new eNB over the X2 interface. Once the new eNB receives the security context from the last eNB to which UE was attached, it performs establishes the security context for the UE and the call flow continues such as from stage 6 in the enhanced Service Request procedure illustrated in FIG. 8.

Figure 12:
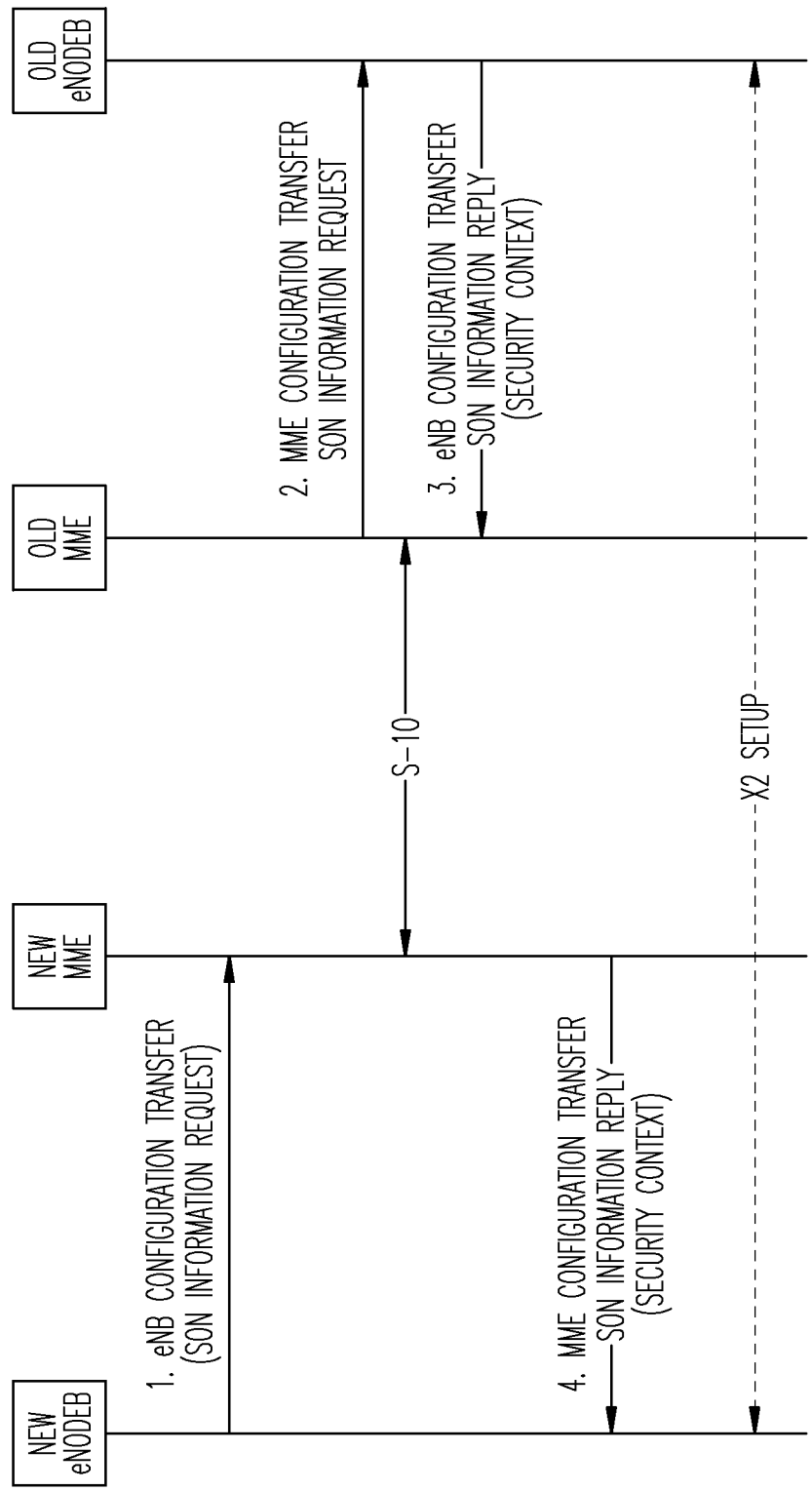
FIG. 12 illustrates an example of transferring security context from an old eNB to a new eNB using a Configuration Transfer Procedure.

In another embodiment, the Configuration Transfer procedure is used to transfer the security context at the Old eNB to the new eNB via the MME. When a UE initiates a Service Request procedure, it sends the new eNB the ECGI of the eNB it was last connected to. This is accomplished by piggybacking the last eNB information on the NAS Service Request. The eNB compares ECGI information with its own ECGI information and checks if the UE has changed eNBs. If so, the new eNB initiates a configuration transfer procedure as shown in FIG. 12. At stage 1, the new eNB sends the MME an eNB Configuration Transfer message with the SON (self organizing network) Configuration Transfer IE and SON Information Request IE. At stage 2, the MME transparently forwards this message to the eNB indicated in the Target eNB-ID IE which is included in the SON Configuration Transfer IE. At stages 3 and 4, the old eNB, on receiving the SON Information IE containing the SON Information Request IE, transfers back the requested information towards the eNB indicated in the Source eNB-ID IE of the SON Configuration Transfer IE by initiating the eNB Configuration Transfer procedure. The Configuration Transfer messages are enhanced in order to request the security context from the old eNB. In this embodiment, the context transfer via the MME as depicted in FIG. 12 would replace stages 6 through 8 in FIG. 11

Additional Notes and Examples

In Example 1, an evolved Node B (eNB) for operating in an LTE (Long Term Evolution) network, comprises: processing circuitry; a radio interface for communicating with user equipment (UEs); an S1-MME network interface for communicating with a mobile management entity (MME); an S1-U network interface for communicating with a serving gateway (S-GW); wherein the processing circuitry is to, when a request for an always-on S1-U bearer is received from the UE, instruct the MME to provide the UE with an S1-U bearer that persists as the UE moves between RRC_CONNECTED and RRC_IDLE states and preserve the UE context information during an S1 Release procedure or when the UE otherwise goes into an RRC_IDLE or ECM-IDLE state.

In Example 2, the subject matter of Example 1 may optionally include wherein the processing circuitry is to receive the request for the always-on S1-U bearer via an RRC Connection Request message from the UE with an always-on indicator contained therein.

In Example 3, the subject matter of Example 2 may optionally include wherein the always-on indicator in the RRC Connection Request message is an establishment cause for either mobile originating access or mobile terminating access.

In Example 4, the subject matter of Example 1 may optionally include wherein the processing circuitry is to inform the MME of the request for the always-on S1-U bearer by forwarding the establishment cause of the RRC Connection Request message containing the always-on indicator in an S1-AP Initial UE message to the MME.

In Example 5, the subject matter of Example 1 may optionally include wherein the processing circuitry is to inform the MME of the request for the always-on S1-U bearer by using non-access stratum (NAS) messages sent from the UE to the eNB and thence to the MME.

In Example 6, the subject matter of Example 5 may optionally include wherein the processing circuitry is to inform the MME of the request for the always-on S1-U bearer by forwarding an Attach Request message from the UE containing the always-on indicator in the EPS Attach Type field of the message.

In Example 7, the subject matter of Example 5 may optionally include wherein the processing circuitry is to inform the MME of the request for the always-on S1-U bearer by forwarding an Attach Request message from the UE containing the always-on indicator in the Update Type field of the message.

In Example 8, the subject matter of Example 5 may optionally include wherein the processing circuitry is to inform the MME of the request for the always-on S1-U bearer by forwarding an Attach Request message from the UE containing the always-on indicator in a separate information element (IE) of the message.

In Example 9, the subject matter of Example 5 may optionally include wherein the processing circuitry is to inform the MME of the request for the always-on S1-U bearer by forwarding a Service Request message from the UE containing the always-on indicator.

In Example 10, the subject matter of Example 5 may optionally include wherein the processing circuitry is to inform the MME of the request for the always-on S1-U bearer by forwarding a Tracking Area Update Request message from the UE containing the always-on indicator.

In Example 11, the subject matter of Example 1 may optionally include wherein the processing circuitry is to, after receiving an Attach Accept message from the MME in response to the Attach Request sent by the UE, forward the Attach Accept message to the UE, wherein the IP (internet protocol) address of the selected S-GW and the S-GW TEID (tunnel endpoint identifier) assigned to the always-on S1-U bearer are contained in the Attach Accept message.

In Example 12, the subject matter of Example 1 may optionally include wherein the processing circuitry is to, after receiving an Attach Accept message from the MME in response to the Attach Request sent by the UE, sending an RRC Connection Reconfiguration message to the UE, wherein the IP (internet protocol) address of the selected S-GW and the S-GW TEID (tunnel endpoint identifier) assigned to the always-on S1-U bearer are contained in the RRC Connection Reconfiguration message.

In Example 13, the subject matter of Example 1 may optionally include wherein the processing circuitry is to, upon expiration of a user inactivity timer for a particular UE, check if an S1-U bearer for the particular UE is an always-on bearer and, if so, initiate an S1 Release procedure while retaining the particular UE's context.

In Example 14, the subject matter of Example 13 may optionally include wherein the processing circuitry is to, after initiating an S1 Release for a UE with an always-on S1-U bearer, if a handover has occurred such that the UE has been assigned to a new eNB with an S-GW relocation, embedding the new S-GW IP address and S-GW TEID assigned to the always-on S1-U bearer in an RRC Connection Release message.

In Example 15, the subject matter of Example 1 may optionally include wherein the processing circuitry is to, when a Tracking Area Update procedure with a change in S-GW occurs for a UE with an always-on S1-U bearer, forward the Tracking Area Update Accept message from the MME to the UE along with the new S-GW IP address and S-GW TEID assigned to the always-on S1-U bearer.

In Example 16, the subject matter of Example 1 may optionally include wherein the processing circuitry is to, after receiving an NAS Service Request message from a UE with an always-on S1-U bearer along with an S-GW IP address and S-GW TEID assigned to the always-on S1-U bearer, map the always-on S1-U bearer to a radio bearer of the UE.

In Example 17, the subject matter of Example 16 may optionally include wherein the processing circuitry is to, after mapping the always-on S1-U bearer to the radio bearer of the UE, connect to the always-on S1-U bearer and transmit data to the S-GW to inform the S-GW of the DL (downlink) eNB TEID.

In Example 18, the subject matter of Example 1 may optionally include wherein the processing circuitry is to, if a handover has occurred such that a UE with an always-on S1-U bearer has been newly assigned to the eNB, send a Path Switch Request Message to the UE's MME and acquire the new S-GW IP address and S-GW TEID assigned to the always-on S1-U bearer from the MME in a Path Switch Request Acknowledge message.

In Example 19, the subject matter of Example 1 may optionally further comprise: an X2 network interface for communicating with another eNB; wherein the processing circuitry is to: after receiving an NAS Service Request message from a UE with an always-on S1-U bearer along with an S-GW IP address, S-GW TEID assigned to the always-on S1-U bearer, last eNB IP address, and last eNB ECGI (E-UTRAN Cell Global Identifier), and if the UE's eNB has changed and a low mobility indication has been received from the UE: send an enhanced UE Context Release message to the UE's last eNB that informs the last eNB to release resources associated with the always-on S1-U bearer; re-establish security context with the UE.

In Example 20, the subject matter of Example 1 may optionally further comprise: an X2 network interface for communicating with another eNB; wherein the processing circuitry is to: after receiving an NAS Service Request message from a UE with an always-on S1-U bearer along with an S-GW IP address, S-GW TEID assigned to the always-on S1-U bearer, last eNB IP address, and last eNB ECGI (E-UTRAN Cell Global Identifier), and if the UE's eNB has changed: send a Request Security Context message to the last eNB in order to request the last eNB to transfer the UE's security context; and, receive a Security Context Response message from the last eNB that includes the UE's security context.

In Example 21, the subject matter of Example 1 may optionally further comprise: an X2 network interface for communicating with another eNB; wherein the processing circuitry is to: after receiving an NAS Service Request message from a UE with an always-on S1-U bearer along with an S-GW IP address, S-GW TEID assigned to the always-on S1-U bearer, last eNB IP address, and last eNB ECGI (E-UTRAN Cell Global Identifier), and if the UE's eNB has changed: send to the UE's MME an enhanced eNB Configuration Transfer message with the SON (Self-Organizing Network) Configuration Transfer IE and SON Information Request IE for forwarding to the last eNB as indicated in the Target eNB-ID IE included in the SON Configuration Transfer IE; and, receive the information requested by the enhanced eNB Configuration Transfer message from the last eNB including the UE's security context.

In Example 22, a mobile management entity (MME) for operating in an LTE (Long Term Evolution) network comprises: processing circuitry; an S1-MME network interface for communicating with a evolved Node B (eNB); an S11 network interface for communicating with a serving gateway (S-GW); wherein the processing circuitry is to, when a request for an always-on S1-U bearer is forwarded by the eNB from a UE (user equipment), establish an always-on S1-U bearer for the UE that persists as the UE moves between RRC_CONNECTED and RRC_IDLE states and preserve the UE context information during an S1 Release procedure or when the UE otherwise goes into an RRC_IDLE or ECM-IDLE state.

In Example 23, the subject matter of Example 22 may optionally include wherein the processing circuitry is to establish the always-on S1-U bearer by sending a Create Session Request message, with a request type set to an always-on S1-U bearer, to a selected S-GW which is forwarded to a P-GW (packet data network gateway) in order to set up a default EPS (evolved packet system) bearer.

In Example 24, the subject matter of Example 23 may optionally further comprise an S6a network interface for communicating with an HSS (home subscriber server) and wherein the processing circuitry is to, before sending the Create Session Request message to establish the always-on S1-U bearer, confirm the need for the always-on S1U bearer by verifying the UE's subscription data with the HSS.

In Example 25, the subject matter of Example 23 may optionally include wherein the processing circuitry is to receive a Create Session Response message forwarded by the S-GW from the P-GW in response to the Create Session Request message and send an Attach Accept message to the UE as forwarded by the eNB to inform the UE of the IP (internet protocol) address of the selected S-GW and the S-GW TEID (tunnel endpoint identifier) assigned to the always-on S1-U bearer.

In Example 26, the subject matter of Example 23 may optionally include wherein the processing circuitry is to, when eNB and S-GW relocations to a new eNB and a new S-GW occur and after receiving a Path Switch Request message from the new eNB, send a Create Session Request message to the new S-GW that updates bearer contexts for the default bearers that have been accepted by the new eNB, receive a Create Session Response message from the new S-GW, and send a Path Switch Request Acknowledgement message to the new eNB that contains updates for the IP address of the S-GW and the S-GW TEID (tunnel endpoint identifier) assigned to the always-on S1-U bearer.

In Example 27, a serving gateway (S-GW) for operating in an LTE (Long Term Evolution) network, comprises: processing circuitry; an S1-U network interface for communicating with a evolved Node B (eNB); an S11 network interface for communicating with a mobile management entity (MME); wherein the processing circuitry is to, when a Create Session Request message with a request type set to an always-on S1-U bearer is received from the MME, set up a default EPS bearer with an always-on S1-U bearer for the UE that persists during an S1 Release procedure or when the UE otherwise goes into an RRC_IDLE or ECM-IDLE state.

In Example 28, the subject matter of Example 27 may optionally include wherein the processing circuitry is to, if the UE is not in a high mobility state, assign the S-GW TEID (tunnel endpoint identifier) for the always-on S1-U bearer so that its value is unique for the S1-U interface used for the always-on S1-U bearer.

In Example 29, the subject matter of Example 27 may optionally include wherein the processing circuitry is to, if the UE is in a high mobility state, assign the S-GW TEID (tunnel endpoint identifier) for the always-on S1-U bearer so that its value is unique across all S1-U interfaces served by the S-GW.

In Example 30, the subject matter of Example 27 may optionally include wherein the processing circuitry is to run an inactivity timer of same or less value than an inactivity timer used by the eNB and, if the S-GW's inactivity timer expires, to mark the UE as idle and send a downlink data notification to the MME if downlink data for the UE is received.

In Example 31, a UE (user equipment) for operating in an LTE (Long Term Evolution) network, comprises: a radio transceiver to provide an air interface for communicating with an eNB (evolved node B); and processing circuitry connected to the radio transceiver to, if an application is run with small data transfers such that the number of transitions between RRC_CONNECTED and RRC_IDLE states exceeds a specified threshold, send a message to the eNB that requests an always-on S1-U bearer that persists as the UE moves between RRC_CONNECTED and RRC_IDLE states.

In Example 32, the subject matter of Example 31 may optionally include wherein the processing circuitry is to send the request for the always-on S1-U bearer via an RRC Connection Request message from the UE with an always-on indicator contained therein.

In Example 33, the subject matter of Example 31 may optionally include wherein the processing circuitry is to send the request for the always-on S1-U bearer to the eNB via a non-access stratum (NAS) message.

Example 34 is a method for carrying the functions performed by the processing circuitry in any of Examples 1 through 33.

In Example 35, a machine-readable medium containing instructions that, when executed, cause a machine to carry out functions performed by the processing circuitry as recited by any of Examples 1 through 33.

In Example 36, a system comprises means for to carrying out the functions performed by the processing circuitry as recited by any of Examples 1 through 33.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as eNode-B.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An evolved Node B (eNB) for operating in an LTE (Long Term Evolution) network, comprising:
   processing circuitry;
   a radio interface for communicating with user equipment (UEs);
   an S1-MME network interface for communicating with a mobile management entity (MME);
   an S1-U network interface for communicating with a serving gateway (S-GW);
   an X2 network interface for communicating with another eNB;
   wherein the processing circuitry is to, when a request for an always-on S1-U bearer is received from a UE, instruct the MME to provide the UE with an S1-U bearer that persists as the UE moves between RRC_CONNECTED and RRC_IDLE states and preserve the UE context information during an S1 Release procedure or when the UE otherwise goes into an RRC_IDLE or ECM-IDLE state; and,
   after receiving an NAS (non-access stratum) Service Request message from a UE with an always-on S1-U bearer along with an S-GW IP address, S-GW TEID assigned to the always-on S1-U bearer, last eNB IP address, and last eNB ECGI (E-UTRAN Cell Global Identifier), and if the UE's eNB has changed and a low mobility indication has been received from the UE, the processing circuitry is further to:
   send an enhanced UE Context Release message to the UE's last eNB that informs the last eNB to release resources associated with the always-on S1-U bearer;
   re-establish security context with the UE.

2. The eNB of claim 1 wherein the processing circuitry is to receive the request for the always-on S1-U bearer via an RRC Connection Request message from the UE with an always-on indicator contained therein.

3. The eNB of claim 2 wherein the always-on indicator in the RRC Connection Request message is an establishment cause for either mobile originating access or mobile terminating access.

4. The eNB of claim 1 wherein the processing circuitry is to inform the MME of the request for the always-on S1-U bearer by forwarding the establishment cause of the RRC Connection Request message containing the always-on indicator in an S1-AP Initial UE message to the MME.

5. The eNB of claim 1 wherein the processing circuitry is to inform the MME of the request for the always-on S1-U bearer by using non-access stratum (NAS) messages sent from the UE to the eNB and thence to the MME.

6. The eNB of claim 5 wherein the processing circuitry is to inform the MME of the request for the always-on S1-U bearer by forwarding an Attach Request message from the UE containing the always-on indicator in the EPS Attach Type field of the message.

7. The eNB of claim 5 wherein the processing circuitry is to inform the MME of the request for the always-on S1-U bearer by forwarding an Attach Request message from the UE containing the always-on indicator in the Update Type field of the message.

8. The eNB of claim 5 wherein the processing circuitry is to inform the MME of the request for the always-on S1-U bearer by forwarding an Attach Request message from the UE containing the always-on indicator in a separate information element (IE) of the message.

9. The eNB of claim 5 wherein the processing circuitry is to inform the MME of the request for the always-on S1-U bearer by forwarding a Service Request message from the UE containing the always-on indicator.

10. The eNB of claim 5 wherein the processing circuitry is to inform the MME of the request for the always-on S1-U bearer by forwarding a Tracking Area Update Request message from the UE containing the always-on indicator.

11. The eNB of claim 1 wherein the processing circuitry is to, after receiving an Attach Accept message from the MME in response to the Attach Request sent by the UE, forward the Attach Accept message to the UE, wherein the IP (internet protocol) address of the selected S-GW and the S-GW TEID (tunnel endpoint identifier) assigned to the always-on S1-U bearer are contained in the Attach Accept message.

12. The eNB of claim 1 wherein the processing circuitry is to, after receiving an Attach Accept message from the MME in response to the Attach Request sent by the UE, send an RRC Connection Reconfiguration message to the UE, wherein the IP (internet protocol) address of the selected S-GW and the S-GW TEID (tunnel endpoint identifier) assigned to the always-on S1-U bearer are contained in the RRC Connection Reconfiguration message.

13. The eNB of claim 1 wherein the processing circuitry is to, upon expiration of a user inactivity timer for a particular UE, check if an S1-U bearer for the particular UE is an always-on bearer and, if so, initiate an S1 Release procedure while retaining the particular UE's context.

14. The eNB of claim 13 wherein the processing circuitry is to, after initiating an S1 Release for a UE with an always-on S1-U bearer, if a handover has occurred such that the UE has been assigned to a new eNB with an S-GW relocation, embed the new S-GW IP address and S-GW TEID assigned to the always-on S1-U bearer in an RRC Connection Release message.

15. The eNB of claim 1 wherein the processing circuitry is to, when a Tracking Area Update procedure with a change in S-GW occurs for a UE with an always-on S1-U bearer, forward the Tracking Area Update Accept message from the MME to the UE along with the new S-GW IP address and S-GW TEID assigned to the always-on S1-U bearer.

16. The eNB of claim 1 wherein the processing circuitry is to, after receiving an NAS Service Request message from a UE with an always-on S1-U bearer along with an S-GW IP address and S-GW TEID assigned to the always-on S1-U bearer, map the always-on S1-U bearer to a radio bearer of the UE.

17. The eNB of claim 16 wherein the processing circuitry is to, after mapping the always-on S1-U bearer to the radio bearer of the UE, connect to the always-on S1-U bearer and transmit data to the S-GW to inform the S-GW of the DL (downlink) eNB TEID.

18. The eNB of claim 1 wherein the processing circuitry is to, if a handover has occurred such that a UE with an always-on S1-U bearer has been newly assigned to the eNB, send a Path Switch Request Message to the UE's MME and acquire the new S-GW IP address and S-GW TEID assigned to the always-on S1-U bearer from the MME in a Path Switch Request Acknowledge message.

19. An evolved Node B (eNB) for operating in an LTE (Long Term Evolution) network, comprising:
processing circuitry;
a radio interface for communicating with user equipment (UEs);
an S1-MME network interface for communicating with a mobile management entity (MME);
an S1-U network interface for communicating with a serving gateway (S-GW);
an X2 network interface for communicating with another eNB;
wherein the processing circuitry is to, when a request for an always-on S1-U bearer is received from a UE, instruct the MME to provide the UE with an S1-U bearer that persists as the UE moves between RRC_CONNECTED and RRC_IDLE states and preserve the UE context information during an S1 Release procedure or when the UE otherwise goes into an RRC_IDLE or ECM-IDLE state; and,
after receiving an NAS Service Request message from a UE with an always-on S1-U bearer along with an S-GW IP address, S-GW TEID assigned to the always-on S1-U bearer, last eNB IP address, and last eNB ECGI (E-UTRAN Cell Global Identifier), and if the UE's eNB has changed, the processing circuitry is further to:
send a Request Security Context message to the last eNB in order to request the last eNB to transfer the UE's security context; and,
receive a Security Context Response message from the last eNB that includes the UE's security context.

20. The eNB of claim 19 wherein the processing circuitry is to receive the request for the always-on S1-U bearer via an RRC Connection Request message from the UE with an always-on indicator contained therein.

21. The eNB of claim 19 wherein the always-on indicator in the RRC Connection Request message is an establishment cause for either mobile originating access or mobile terminating access.

22. An evolved Node B (eNB) for operating in an LTE (Long Term Evolution) network, comprising:
processing circuitry;
a radio interface for communicating with user equipment (UEs);
an S1-MME network interface for communicating with a mobile management entity (MME);
an S1-U network interface for communicating with a serving gateway (S-GW);
an X2 network interface for communicating with another eNB;
wherein the processing circuitry is to, when a request for an always-on S1-U bearer is received from a UE, instruct the MME to provide the UE with an S1-U bearer that persists as the UE moves between RRC_CONNECTED and RRC_IDLE states and preserve the UE context information during an S1 Release procedure or when the UE otherwise goes into an RRC_IDLE or ECM-IDLE state; and, after receiving an NAS Service Request message from a UE with an always-on S1-U bearer along with an S-GW IP address, S-GW TEID assigned to the always-on S1-U bearer, last eNB IP address, and last eNB ECGI (E-UTRAN Cell Global Identifier), and if the UE's eNB has changed, the processing circuitry is further to:

send to the UE's MME an enhanced eNB Configuration Transfer message with a SON (Self-Organizing Network) Configuration Transfer IE and SON Information Request IE for forwarding to the last eNB as indicated in the Target eNB-ID IE included in the SON Configuration Transfer IE; and, receive the information requested by the enhanced eNB Configuration Transfer message from the last eNB including the UE's security context.

23. The eNB of claim 22 wherein the processing circuitry is to receive the request for the always-on S1-U bearer via an RRC Connection Request message from the UE with an always-on indicator contained therein.

24. The eNB of claim 22 herein the always-on indicator in the RRC Connection Request message is an establishment cause for either mobile originating access or mobile terminating access.

* * * * *

UNITED STATES PATENT AND TRADEMARK OFFICE
CERTIFICATE OF CORRECTION

PATENT NO. : 9,609,602 B2
APPLICATION NO. : 14/126252
DATED : March 28, 2017
INVENTOR(S) : Jain et al.

Page 1 of 1

It is certified that error appears in the above-identified patent and that said Letters Patent is hereby corrected as shown below:

On the Title Page

On page 3, in Column 2, under "Other Publications", Line 11, delete "P201331103,Response" and insert --P201331103, Response-- therefor On page 4, in Column 2, under "Other Publications", Line 49, delete "P201331103,Response" and insert --P201331103, Response-- therefor In the Claims In Column 19, Line 23, in Claim 24, delete "herein" and insert --wherein-- therefor Signed and Sealed this
Fourth Day of June, 2019

Andrei Iancu
*Director of the United States Patent and Trademark Office*